(12) United States Patent
Hern et al.

(10) Patent No.: US 10,941,951 B2
(45) Date of Patent: Mar. 9, 2021

(54) SYSTEMS AND METHODS FOR TEMPERATURE AND HUMIDITY CONTROL

(71) Applicant: Johnson Controls Technology Company, Plymouth, MI (US)

(72) Inventors: Shawn A. Hern, Park City, KS (US); Brian D. Rigg, Douglass, KS (US); Tom R. Tasker, Andover, KS (US); Jedidiah O. Bentz, Wichita, KS (US); Theresa N. Gillette, Wichita, KS (US); Shaun B. Atchison, Wichita, KS (US); Tyler McCune, El Dorado, KS (US); Aneek M. Noor, Wichita, KS (US); Cody J. Kaiser, Wichita, KS (US); Daniel S. Middleton, Wichita, KS (US)

(73) Assignee: Johnson Controls Technology Company, Plymouth, MI (US)

( * ) Notice: Subject to any disclaimer, the term of this patent is extended or adjusted under 35 U.S.C. 154(b) by 220 days.

(21) Appl. No.: 15/417,185

(22) Filed: Jan. 26, 2017

(65) Prior Publication Data
US 2018/0031258 A1 Feb. 1, 2018

Related U.S. Application Data

(60) Provisional application No. 62/367,572, filed on Jul. 27, 2016, provisional application No. 62/367,358, (Continued)

(51) Int. Cl.
*F24F 11/30* (2018.01)
*F24F 1/08* (2011.01)
(Continued)

(52) U.S. Cl.
CPC ............ *F24F 11/30* (2018.01); *F24F 1/0003* (2013.01); *F24F 1/08* (2013.01); *F24F 11/62* (2018.01);
(Continued)

(58) Field of Classification Search
CPC .. F24F 11/30; F24F 11/62; F24F 11/65; F24F 11/77; F24F 11/83; F24F 11/85;
(Continued)

(56) References Cited

U.S. PATENT DOCUMENTS 4,748,822 A * 6/1988 Erbs ................... F24F 3/001
165/217
5,052,186 A 10/1991 Dudley et al.
(Continued)

FOREIGN PATENT DOCUMENTS

CA 2466854 C 4/2008
CA 2633200 C 1/2011
(Continued)

OTHER PUBLICATIONS

U.S. Appl. No. 15/338,215, filed Oct. 28, 2016, Johnson Controls Technology Company.
(Continued)

*Primary Examiner* — Eric S Ruppert
*Assistant Examiner* — Hans R Weiland
(74) *Attorney, Agent, or Firm* — Foley & Lardner LLP

(57) ABSTRACT

A residential HVAC system includes, a compressor, and an outdoor unit controller in communication with the compressor. The outdoor unit controller is configured to receive an indoor ambient temperature and a temperature set point. The outdoor unit controller is further configured to determine an outdoor ambient temperature, and to determine an operating value for the compressor based on a percentage of a delta between a minimum operating value of the compressor and a maximum operating value of the compressor, plus the minimum operating value. The minimum operating value and the maximum operating value are based on the determined outdoor ambient temperature. The percentage of the delta is based on a predefined temperature differential mul-
(Continued)

tiplier and one or more time dependent multipliers. The outdoor unit controller is further configured to modify the current operating value of the compressor with the determined operating value.

19 Claims, 4 Drawing Sheets

Related U.S. Application Data filed on Jul. 27, 2016, provisional application No. 62/367,315, filed on Jul. 27, 2016, provisional application No. 62/367,576, filed on Jul. 27, 2016.

(51) Int. Cl.
*F24F 11/77* (2018.01)
*F24F 110/12* (2018.01)
*F24F 110/10* (2018.01)
*F24F 11/85* (2018.01)
*F24F 11/62* (2018.01)
*F24F 11/83* (2018.01)
*F24F 1/0003* (2019.01)

(52) U.S. Cl.
CPC .............. *F24F 11/77* (2018.01); *F24F 11/83* (2018.01); *F24F 11/85* (2018.01); *F24F 2110/10* (2018.01); *F24F 2110/12* (2018.01)

(58) Field of Classification Search
CPC .. F24F 11/86; F24F 1/0003; F24F 1/08; F24F 2110/10; F24F 2110/12; F25B 49/022; F25B 49/025; F25B 2600/02; F25B 2600/025; F25B 2600/0253
See application file for complete search history.

(56) References Cited

U.S. PATENT DOCUMENTS

| | | | |
|---|---|---|---|
| 5,062,276 A * | 11/1991 | Dudley | F24F 11/00 62/176.6 |
| 5,263,335 A * | 11/1993 | Isono | F24F 11/0009 62/209 |
| 5,673,568 A * | 10/1997 | Isshiki | F25B 13/00 62/228.4 |
| 5,797,729 A | 8/1998 | Rafuse et al. | |
| 5,970,727 A * | 10/1999 | Hiraoka | F25B 13/00 62/156 |
| 6,164,374 A | 12/2000 | Rhodes et al. | |
| 6,169,937 B1 | 1/2001 | Peterson | |
| 6,227,961 B1 | 5/2001 | Moore et al. | |
| 6,314,750 B1 | 11/2001 | Ishikawa et al. | |
| 6,351,693 B1 | 2/2002 | Monie et al. | |
| 6,435,418 B1 | 8/2002 | Toth et al. | |
| 6,487,869 B1 | 12/2002 | Sulc et al. | |
| 6,557,771 B2 | 5/2003 | Shah | |
| 6,641,054 B2 | 11/2003 | Morey | |
| 6,726,112 B1 | 4/2004 | Ho | |
| 6,726,113 B2 | 4/2004 | Guo | |
| 6,810,307 B1 | 10/2004 | Addy | |
| 6,824,069 B2 | 11/2004 | Rosen | |
| 6,888,441 B2 | 5/2005 | Carey | |
| 6,995,518 B2 | 2/2006 | Havlik et al. | |
| 7,028,912 B1 | 4/2006 | Rosen | |
| 7,083,109 B2 | 8/2006 | Pouchak | |
| 7,099,748 B2 | 8/2006 | Rayburn | |
| 7,140,551 B2 | 11/2006 | De Pauw et al. | |
| 7,146,253 B2 | 12/2006 | Hoog et al. | |
| 7,152,806 B1 | 12/2006 | Rosen | |
| 7,156,317 B1 | 1/2007 | Moore | |
| 7,156,318 B1 | 1/2007 | Rosen | |
| 7,159,789 B2 | 1/2007 | Schwendinger et al. | |
| 7,159,790 B2 | 1/2007 | Schwendinger et al. | |
| 7,167,079 B2 | 1/2007 | Smyth et al. | |
| 7,188,002 B2 | 3/2007 | Chapman et al. | |
| 7,212,887 B2 | 5/2007 | Shah et al. | |
| 7,232,075 B1 | 6/2007 | Rosen | |
| 7,261,243 B2 | 8/2007 | Butler et al. | |
| 7,274,972 B2 | 9/2007 | Amundson et al. | |
| 7,287,709 B2 | 10/2007 | Proffitt et al. | |
| 7,296,426 B2 | 11/2007 | Butler et al. | |
| 7,299,996 B2 | 11/2007 | Garrett et al. | |
| 7,306,165 B2 | 12/2007 | Shah | |
| 7,308,384 B2 | 12/2007 | Shah et al. | |
| 7,317,970 B2 | 1/2008 | Pienta et al. | |
| 7,331,187 B2 | 2/2008 | Kates | |
| 7,343,751 B2 | 3/2008 | Kates | |
| 7,402,780 B2 | 7/2008 | Mueller et al. | |
| 7,434,744 B2 | 10/2008 | Garozzo et al. | |
| 7,442,012 B2 | 10/2008 | Moens | |
| 7,475,558 B2 | 1/2009 | Perry | |
| 7,475,828 B2 | 1/2009 | Bartlett et al. | |
| 7,556,207 B2 | 7/2009 | Mueller et al. | |
| 7,565,813 B2 | 7/2009 | Pouchak | |
| 7,575,179 B2 | 8/2009 | Morrow et al. | |
| 7,584,897 B2 | 9/2009 | Schultz et al. | |
| 7,614,567 B2 | 11/2009 | Chapman et al. | |
| 7,624,931 B2 | 12/2009 | Chapman et al. | |
| 7,633,743 B2 | 12/2009 | Barton et al. | |
| 7,636,604 B2 | 12/2009 | Bergman et al. | |
| 7,638,739 B2 | 12/2009 | Rhodes et al. | |
| 7,641,126 B2 | 1/2010 | Schultz et al. | |
| 7,645,158 B2 | 1/2010 | Mulhouse et al. | |
| 7,667,163 B2 | 2/2010 | Ashworth et al. | |
| 7,726,581 B2 | 6/2010 | Naujok et al. | |
| 7,731,096 B2 | 6/2010 | Lorenz et al. | |
| 7,731,098 B2 | 6/2010 | Butler et al. | |
| 7,740,184 B2 | 6/2010 | Schnell et al. | |
| 7,748,225 B2 | 7/2010 | Butler et al. | |
| 7,748,639 B2 | 7/2010 | Perry | |
| 7,748,640 B2 | 7/2010 | Roher et al. | |
| 7,755,220 B2 | 7/2010 | Sorg et al. | |
| 7,765,826 B2 | 8/2010 | Nichols | |
| 7,770,806 B2 * | 8/2010 | Herzon | F25B 49/02 236/1 C |
| 7,784,291 B2 | 8/2010 | Butler et al. | |
| 7,784,704 B2 | 8/2010 | Harter | |
| 7,802,618 B2 | 9/2010 | Simon et al. | |
| 7,832,221 B2 | 11/2010 | Wijaya et al. | |
| 7,832,652 B2 | 11/2010 | Barton et al. | |
| 7,845,576 B2 | 12/2010 | Siddaramanna et al. | |
| 7,861,941 B2 | 1/2011 | Schultz et al. | |
| 7,867,646 B2 | 1/2011 | Rhodes | |
| 7,908,116 B2 | 3/2011 | Steinberg et al. | |
| 7,908,117 B2 | 3/2011 | Steinberg et al. | |
| 7,918,406 B2 | 4/2011 | Rosen | |
| 7,938,336 B2 | 5/2011 | Rhodes et al. | |
| 7,941,294 B2 | 5/2011 | Shahi et al. | |
| 7,954,726 B2 | 6/2011 | Siddaramanna et al. | |
| 7,963,454 B2 | 6/2011 | Sullivan et al. | |
| 7,979,164 B2 | 7/2011 | Garozzo et al. | |
| 8,010,237 B2 | 8/2011 | Cheung et al. | |
| 8,032,254 B2 | 10/2011 | Amundson et al. | |
| 8,082,065 B2 | 12/2011 | Imes et al. | |
| 8,083,154 B2 | 12/2011 | Schultz et al. | |
| 8,089,032 B2 | 1/2012 | Beland et al. | |
| 8,091,794 B2 | 1/2012 | Siddaramanna et al. | |
| 8,099,195 B2 | 1/2012 | Imes et al. | |
| 8,108,076 B2 | 1/2012 | Imes et al. | |
| 8,131,506 B2 | 3/2012 | Steinberg et al. | |
| 8,141,791 B2 | 3/2012 | Rosen | |
| 8,167,216 B2 | 5/2012 | Schultz et al. | |
| 8,180,492 B2 | 5/2012 | Steinberg | |
| 8,190,296 B2 | 5/2012 | Alhilo | |
| 8,195,313 B1 | 6/2012 | Fadell et al. | |
| 8,196,185 B2 | 6/2012 | Geadelmann et al. | |
| 8,209,059 B2 | 6/2012 | Stockton | |
| 8,239,066 B2 | 8/2012 | Jennings et al. | |
| 8,276,829 B2 | 10/2012 | Stoner et al. | |
| 8,280,536 B1 | 10/2012 | Fadell et al. | |
| 8,289,182 B2 | 10/2012 | Vogel et al. | |
| 8,289,226 B2 | 10/2012 | Takach et al. | |

(56) References Cited

U.S. PATENT DOCUMENTS

| | | |
|---|---|---|
| 8,299,919 B2 | 10/2012 | Dayton et al. |
| 8,321,058 B2 | 11/2012 | Zhou et al. |
| 8,346,396 B2 | 1/2013 | Amundson et al. |
| 8,387,891 B1 | 3/2013 | Simon et al. |
| 8,393,550 B2 | 3/2013 | Simon et al. |
| 8,412,488 B2 | 4/2013 | Steinberg et al. |
| 8,429,566 B2 | 4/2013 | Koushik et al. |
| 8,473,109 B1 | 6/2013 | Imes et al. |
| 8,476,964 B1 | 7/2013 | Atri |
| 8,489,243 B2 | 7/2013 | Fadell et al. |
| 8,504,180 B2 | 8/2013 | Imes et al. |
| 8,510,255 B2 | 8/2013 | Fadell et al. |
| 8,511,576 B2 | 8/2013 | Warren et al. |
| 8,511,577 B2 | 8/2013 | Warren et al. |
| 8,517,088 B2 | 8/2013 | Moore et al. |
| 8,523,083 B2 | 9/2013 | Warren et al. |
| 8,523,084 B2 | 9/2013 | Siddaramanna et al. |
| 8,527,096 B2 | 9/2013 | Pavlak et al. |
| 8,532,827 B2 | 9/2013 | Stefanski et al. |
| 8,544,285 B2 | 10/2013 | Stefanski et al. |
| 8,549,658 B2 | 10/2013 | Kolavennu et al. |
| 8,550,368 B2 | 10/2013 | Butler et al. |
| 8,554,374 B2 | 10/2013 | Lunacek et al. |
| 8,555,662 B2 | 10/2013 | Peterson et al. |
| 8,558,179 B2 | 10/2013 | Filson et al. |
| 8,560,127 B2 | 10/2013 | Leen et al. |
| 8,560,128 B2 | 10/2013 | Ruff et al. |
| 8,571,518 B2 | 10/2013 | Imes et al. |
| 8,596,550 B2 | 12/2013 | Steinberg et al. |
| 8,600,564 B2 | 12/2013 | Imes et al. |
| 8,606,409 B2 | 12/2013 | Amundson et al. |
| 8,613,792 B2 | 12/2013 | Ragland et al. |
| 8,622,314 B2 | 1/2014 | Fisher et al. |
| 8,626,344 B2 | 1/2014 | Imes et al. |
| 8,630,741 B1 | 1/2014 | Matsuoka et al. |
| 8,630,742 B1 | 1/2014 | Stefanski et al. |
| 8,644,009 B2 | 2/2014 | Rylski et al. |
| 8,659,302 B1 | 2/2014 | Warren et al. |
| 8,671,702 B1 | 3/2014 | Shotey et al. |
| 8,674,816 B2 | 3/2014 | Trundle et al. |
| 8,689,572 B2 | 4/2014 | Evans et al. |
| 8,695,887 B2 | 4/2014 | Helt et al. |
| 8,706,270 B2 | 4/2014 | Fadell et al. |
| 8,708,242 B2 | 4/2014 | Conner et al. |
| 8,712,590 B2 | 4/2014 | Steinberg |
| 8,718,826 B2 | 5/2014 | Ramachandran et al. |
| 8,726,680 B2 | 5/2014 | Schenk et al. |
| 8,727,611 B2 | 5/2014 | Huppi et al. |
| 8,738,327 B2 | 5/2014 | Steinberg et al. |
| 8,746,583 B2 | 6/2014 | Simon et al. |
| 8,752,771 B2 | 6/2014 | Warren et al. |
| 8,754,780 B2 | 6/2014 | Petite et al. |
| 8,766,194 B2 | 7/2014 | Filson et al. |
| 8,770,490 B2 | 7/2014 | Drew |
| 8,770,491 B2 | 7/2014 | Warren et al. |
| 8,788,103 B2 | 7/2014 | Warren et al. |
| 8,802,981 B2 | 8/2014 | Wallaert et al. |
| 8,838,282 B1 | 9/2014 | Ratliff et al. |
| 8,843,239 B2 | 9/2014 | Mighdoll et al. |
| 8,850,348 B2 | 9/2014 | Fadell et al. |
| 8,855,830 B2 | 10/2014 | Imes et al. |
| 8,868,219 B2 | 10/2014 | Fadell et al. |
| 8,870,086 B2 | 10/2014 | Tessier et al. |
| 8,870,087 B2 | 10/2014 | Pienta et al. |
| 8,880,047 B2 | 11/2014 | Konicek et al. |
| 8,893,032 B2 | 11/2014 | Bruck et al. |
| 8,903,552 B2 | 12/2014 | Amundson et al. |
| 8,918,219 B2 | 12/2014 | Sloo et al. |
| 8,942,853 B2 | 1/2015 | Stefanski et al. |
| 8,944,338 B2 | 2/2015 | Warren et al. |
| 8,950,686 B2 | 2/2015 | Matsuoka et al. |
| 8,950,687 B2 | 2/2015 | Bergman et al. |
| 8,961,005 B2 | 2/2015 | Huppi et al. |
| 8,978,994 B2 | 3/2015 | Moore et al. |
| 8,998,102 B2 | 4/2015 | Fadell et al. |
| 9,014,686 B2 | 4/2015 | Ramachandran et al. |
| 9,014,860 B2 | 4/2015 | Moore et al. |
| 9,020,647 B2 | 4/2015 | Johnson et al. |
| 9,026,232 B2 | 5/2015 | Fadell et al. |
| 9,033,255 B2 | 5/2015 | Tessier et al. |
| RE45,574 E | 6/2015 | Harter |
| 9,074,784 B2 | 7/2015 | Sullivan et al. |
| 9,075,419 B2 | 7/2015 | Sloo et al. |
| 9,080,782 B1 | 7/2015 | Sheikh |
| 9,081,393 B2 | 7/2015 | Lunacek et al. |
| 9,086,703 B2 | 7/2015 | Warren et al. |
| 9,088,306 B1 | 7/2015 | Ramachandran et al. |
| 9,092,039 B2 | 7/2015 | Fadell et al. |
| 9,098,279 B2 | 8/2015 | Mucignat et al. |
| 9,116,529 B2 | 8/2015 | Warren et al. |
| 9,121,623 B2 | 9/2015 | Filson et al. |
| 9,122,283 B2 | 9/2015 | Rylski et al. |
| 9,125,049 B2 | 9/2015 | Huang et al. |
| 9,127,853 B2 | 9/2015 | Filson et al. |
| 9,134,710 B2 | 9/2015 | Cheung et al. |
| 9,134,715 B2 | 9/2015 | Geadelmann et al. |
| 9,146,041 B2 | 9/2015 | Novotny et al. |
| 9,151,510 B2 | 10/2015 | Leen |
| 9,154,001 B2 | 10/2015 | Dharwada et al. |
| 9,157,764 B2 | 10/2015 | Shetty et al. |
| 9,164,524 B2 | 10/2015 | Imes et al. |
| 9,175,868 B2 | 11/2015 | Fadell et al. |
| 9,175,871 B2 | 11/2015 | Gourlay et al. |
| 9,182,141 B2 | 11/2015 | Sullivan et al. |
| 9,189,751 B2 | 11/2015 | Matsuoka et al. |
| 9,191,277 B2 | 11/2015 | Rezvani et al. |
| 9,191,909 B2 | 11/2015 | Rezvani et al. |
| 9,194,597 B2 | 11/2015 | Steinberg et al. |
| 9,194,598 B2 | 11/2015 | Fadell et al. |
| 9,194,600 B2 | 11/2015 | Kates |
| 9,207,817 B2 | 12/2015 | Tu |
| 9,213,342 B2 | 12/2015 | Drake et al. |
| 9,215,281 B2 | 12/2015 | Iggulden et al. |
| 9,222,693 B2 | 12/2015 | Gourlay et al. |
| 9,223,323 B2 | 12/2015 | Matas et al. |
| 9,234,669 B2 | 1/2016 | Filson et al. |
| 9,244,445 B2 | 1/2016 | Finch et al. |
| 9,244,470 B2 | 1/2016 | Steinberg |
| 9,261,287 B2 | 2/2016 | Warren et al. |
| 9,268,344 B2 | 2/2016 | Warren et al. |
| 9,279,595 B2 | 3/2016 | Mighdoll et al. |
| 9,282,590 B2 | 3/2016 | Donlan |
| 9,285,134 B2 | 3/2016 | Bray et al. |
| 9,286,781 B2 | 3/2016 | Filson et al. |
| 9,291,359 B2 | 3/2016 | Fadell et al. |
| 9,292,022 B2 | 3/2016 | Ramachandran et al. |
| 9,298,196 B2 | 3/2016 | Matsuoka et al. |
| 9,298,197 B2 | 3/2016 | Matsuoka et al. |
| D763,707 S | 8/2016 | Sinha et al. |
| D790,369 S | 6/2017 | Sinha et al. |
| 2001/0015281 A1 | 8/2001 | Schiedegger et al. |
| 2003/0034897 A1 | 2/2003 | Shamoon et al. |
| 2003/0034898 A1 | 2/2003 | Shamoon et al. |
| 2003/0177012 A1 | 9/2003 | Drennan |
| 2004/0074978 A1 | 4/2004 | Rosen |
| 2004/0262410 A1 | 12/2004 | Hull |
| 2005/0040943 A1 | 2/2005 | Winick |
| 2005/0083168 A1 | 4/2005 | Breitenbach |
| 2005/0194456 A1 | 9/2005 | Tessier et al. |
| 2005/0195757 A1 | 9/2005 | Kidder et al. |
| 2005/0270151 A1 | 12/2005 | Winick |
| 2006/0038025 A1 | 2/2006 | Lee |
| 2006/0113398 A1 | 6/2006 | Ashworth |
| 2006/0130504 A1* | 6/2006 | Agrawal .................. F25B 49/02 62/228.4 |
| 2006/0192022 A1 | 8/2006 | Barton et al. |
| 2006/0260334 A1 | 11/2006 | Carey et al. |
| 2007/0013532 A1 | 1/2007 | Ehlers |
| 2007/0045431 A1 | 3/2007 | Chapman et al. |
| 2007/0050732 A1 | 3/2007 | Chapman et al. |
| 2007/0057079 A1 | 3/2007 | Stark et al. |
| 2007/0114295 A1 | 5/2007 | Jenkins |
| 2007/0198099 A9 | 8/2007 | Shah |
| 2007/0228182 A1 | 10/2007 | Wagner et al. |

(56) References Cited

U.S. PATENT DOCUMENTS

| | | |
|---|---|---|
| 2007/0228183 A1 | 10/2007 | Kennedy et al. |
| 2007/0241203 A1 | 10/2007 | Wagner et al. |
| 2008/0048046 A1 | 2/2008 | Wagner et al. |
| 2008/0054084 A1 | 3/2008 | Olson |
| 2008/0099568 A1 | 5/2008 | Nicodem et al. |
| 2008/0120446 A1 | 5/2008 | Butler et al. |
| 2008/0161978 A1 | 7/2008 | Shah |
| 2008/0216495 A1 | 9/2008 | Kates |
| 2008/0223051 A1 | 9/2008 | Kates |
| 2008/0289347 A1 | 11/2008 | Kadle et al. |
| 2008/0290183 A1 | 11/2008 | Laberge et al. |
| 2008/0294274 A1 | 11/2008 | Laberge et al. |
| 2008/0295030 A1 | 11/2008 | Laberge et al. |
| 2009/0140065 A1 | 6/2009 | Juntunen et al. |
| 2009/0143880 A1 | 6/2009 | Amundson et al. |
| 2009/0143918 A1 | 6/2009 | Amundson et al. |
| 2009/0251422 A1 | 10/2009 | Wu et al. |
| 2009/0276096 A1 | 11/2009 | Proffitt et al. |
| 2010/0070092 A1 | 3/2010 | Winter et al. |
| 2010/0084482 A1 | 4/2010 | Kennedy et al. |
| 2010/0131884 A1 | 5/2010 | Shah |
| 2010/0163633 A1 | 7/2010 | Barrett et al. |
| 2010/0163635 A1 | 7/2010 | Ye |
| 2010/0171889 A1 | 7/2010 | Pantel et al. |
| 2010/0182743 A1 | 7/2010 | Roher |
| 2010/0204834 A1 | 8/2010 | Comerford et al. |
| 2010/0212879 A1 | 8/2010 | Schnell et al. |
| 2010/0250707 A1 | 9/2010 | Dalley et al. |
| 2011/0006887 A1 | 1/2011 | Shaull et al. |
| 2011/0067851 A1 | 3/2011 | Terlson et al. |
| 2011/0088416 A1 | 4/2011 | Koethler |
| 2011/0132991 A1 | 6/2011 | Moody et al. |
| 2011/0181412 A1 | 7/2011 | Alexander et al. |
| 2011/0264279 A1 | 10/2011 | Poth |
| 2012/0001873 A1 | 1/2012 | Wu et al. |
| 2012/0007555 A1 | 1/2012 | Bukow |
| 2012/0048955 A1 | 3/2012 | Lin et al. |
| 2012/0061480 A1 | 3/2012 | Deligiannis et al. |
| 2012/0093141 A1 | 4/2012 | Imes et al. |
| 2012/0095601 A1 | 4/2012 | Abraham et al. |
| 2012/0101637 A1 | 4/2012 | Imes et al. |
| 2012/0126020 A1 | 5/2012 | Filson et al. |
| 2012/0126021 A1 | 5/2012 | Warren et al. |
| 2012/0131504 A1 | 5/2012 | Fadell et al. |
| 2012/0165993 A1 | 6/2012 | Whitehouse |
| 2012/0181010 A1 | 7/2012 | Schultz et al. |
| 2012/0191257 A1 | 7/2012 | Corcoran et al. |
| 2012/0193437 A1 | 8/2012 | Henry et al. |
| 2012/0229521 A1 | 9/2012 | Hales et al. |
| 2012/0230661 A1 | 9/2012 | Alhilo |
| 2012/0239207 A1 | 9/2012 | Fadell et al. |
| 2012/0298763 A1 | 11/2012 | Young |
| 2012/0303165 A1 | 11/2012 | Qu et al. |
| 2012/0303828 A1 | 11/2012 | Young et al. |
| 2012/0310418 A1 | 12/2012 | Harrod et al. |
| 2013/0002447 A1 | 1/2013 | Vogel et al. |
| 2013/0054758 A1 | 2/2013 | Imes et al. |
| 2013/0057381 A1 | 3/2013 | Kandhasamy |
| 2013/0090767 A1 | 4/2013 | Bruck et al. |
| 2013/0099008 A1 | 4/2013 | Aljabari et al. |
| 2013/0099009 A1 | 4/2013 | Filson et al. |
| 2013/0123991 A1 | 5/2013 | Richmond |
| 2013/0138250 A1 | 5/2013 | Mowery et al. |
| 2013/0144443 A1 | 6/2013 | Casson et al. |
| 2013/0151016 A1 | 6/2013 | Bias et al. |
| 2013/0151018 A1 | 6/2013 | Bias et al. |
| 2013/0180700 A1 | 7/2013 | Aycock |
| 2013/0190932 A1 | 7/2013 | Schuman |
| 2013/0204408 A1 | 8/2013 | Thiruvengada et al. |
| 2013/0204441 A1 | 8/2013 | Sloo et al. |
| 2013/0204442 A1 | 8/2013 | Modi et al. |
| 2013/0211600 A1 | 8/2013 | Dean-Hendricks et al. |
| 2013/0215058 A1 | 8/2013 | Brazell et al. |
| 2013/0221117 A1 | 8/2013 | Warren et al. |
| 2013/0228633 A1 | 9/2013 | Toth et al. |
| 2013/0234840 A1 | 9/2013 | Trundle et al. |
| 2013/0238142 A1 | 9/2013 | Nichols et al. |
| 2013/0245838 A1 | 9/2013 | Zywicki et al. |
| 2013/0261803 A1 | 10/2013 | Kolavennu |
| 2013/0261807 A1 | 10/2013 | Zywicki et al. |
| 2013/0268129 A1 | 10/2013 | Fadell et al. |
| 2013/0292481 A1 | 11/2013 | Filson et al. |
| 2013/0297078 A1 | 11/2013 | Kolavennu |
| 2013/0318217 A1 | 11/2013 | Imes et al. |
| 2013/0318444 A1 | 11/2013 | Imes et al. |
| 2013/0325190 A1 | 12/2013 | Imes et al. |
| 2013/0338837 A1 | 12/2013 | Hublou et al. |
| 2013/0338839 A1 | 12/2013 | Rogers et al. |
| 2013/0340993 A1 | 12/2013 | Siddaramanna et al. |
| 2013/0345882 A1 | 12/2013 | Dushane et al. |
| 2014/0000861 A1 | 1/2014 | Barrett et al. |
| 2014/0002461 A1 | 1/2014 | Wang |
| 2014/0031989 A1 | 1/2014 | Bergman et al. |
| 2014/0034284 A1 | 2/2014 | Butler et al. |
| 2014/0039692 A1 | 2/2014 | Leen et al. |
| 2014/0041846 A1 | 2/2014 | Leen et al. |
| 2014/0048608 A1 | 2/2014 | Frank |
| 2014/0052300 A1 | 2/2014 | Matsuoka et al. |
| 2014/0058806 A1 | 2/2014 | Guenette et al. |
| 2014/0081466 A1 | 3/2014 | Huapeng et al. |
| 2014/0112331 A1 | 4/2014 | Rosen |
| 2014/0114706 A1 | 4/2014 | Blakely |
| 2014/0116074 A1* | 5/2014 | Jeong .................... F25B 49/025 62/115 |
| 2014/0117103 A1 | 5/2014 | Rossi et al. |
| 2014/0118285 A1 | 5/2014 | Poplawski |
| 2014/0129034 A1 | 5/2014 | Stefanski et al. |
| 2014/0149270 A1 | 5/2014 | Lombard et al. |
| 2014/0151456 A1 | 6/2014 | McCurnin et al. |
| 2014/0152631 A1 | 6/2014 | Moore et al. |
| 2014/0156087 A1 | 6/2014 | Amundson |
| 2014/0158338 A1 | 6/2014 | Kates |
| 2014/0165612 A1 | 6/2014 | Qu et al. |
| 2014/0175181 A1 | 6/2014 | Warren et al. |
| 2014/0188288 A1 | 7/2014 | Fisher et al. |
| 2014/0191848 A1 | 7/2014 | Imes et al. |
| 2014/0202188 A1* | 7/2014 | Hrejsa ..................... F24F 11/30 62/228.1 |
| 2014/0207291 A1 | 7/2014 | Golden et al. |
| 2014/0207292 A1 | 7/2014 | Ramagem et al. |
| 2014/0214212 A1 | 7/2014 | Leen et al. |
| 2014/0216078 A1 | 8/2014 | Ladd |
| 2014/0217185 A1 | 8/2014 | Bicknell |
| 2014/0217186 A1 | 8/2014 | Kramer et al. |
| 2014/0228983 A1 | 8/2014 | Groskreutz et al. |
| 2014/0231530 A1 | 8/2014 | Warren et al. |
| 2014/0244047 A1 | 8/2014 | Oh et al. |
| 2014/0250399 A1 | 9/2014 | Gaherwar |
| 2014/0262196 A1 | 9/2014 | Frank et al. |
| 2014/0262484 A1 | 9/2014 | Khoury et al. |
| 2014/0263679 A1 | 9/2014 | Conner et al. |
| 2014/0267008 A1 | 9/2014 | Jain et al. |
| 2014/0277762 A1 | 9/2014 | Drew |
| 2014/0277769 A1 | 9/2014 | Matsuoka et al. |
| 2014/0277770 A1 | 9/2014 | Aljabari et al. |
| 2014/0299670 A1 | 10/2014 | Ramachandran et al. |
| 2014/0309792 A1 | 10/2014 | Drew |
| 2014/0312129 A1 | 10/2014 | Zikes et al. |
| 2014/0312131 A1 | 10/2014 | Tousignant et al. |
| 2014/0312694 A1 | 10/2014 | Tu et al. |
| 2014/0316585 A1 | 10/2014 | Boesveld et al. |
| 2014/0316586 A1 | 10/2014 | Boesveld et al. |
| 2014/0316587 A1 | 10/2014 | Imes et al. |
| 2014/0317029 A1 | 10/2014 | Matsuoka et al. |
| 2014/0319231 A1 | 10/2014 | Matsuoka et al. |
| 2014/0319236 A1 | 10/2014 | Novotny et al. |
| 2014/0321011 A1 | 10/2014 | Bisson et al. |
| 2014/0324232 A1 | 10/2014 | Modi et al. |
| 2014/0330435 A1 | 11/2014 | Stoner et al. |
| 2014/0346239 A1 | 11/2014 | Fadell et al. |
| 2014/0358295 A1 | 12/2014 | Warren et al. |
| 2014/0367475 A1 | 12/2014 | Fadell et al. |
| 2014/0376530 A1 | 12/2014 | Erickson et al. |
| 2015/0001361 A1 | 1/2015 | Gagne et al. |

(56) References Cited

U.S. PATENT DOCUMENTS

| | | |
|---|---|---|
| 2015/0002165 A1 | 1/2015 | Juntunen et al. |
| 2015/0016443 A1 | 1/2015 | Erickson et al. |
| 2015/0025693 A1 | 1/2015 | Wu et al. |
| 2015/0039137 A1 | 2/2015 | Perry et al. |
| 2015/0041551 A1 | 2/2015 | Tessier et al. |
| 2015/0043615 A1 | 2/2015 | Steinberg et al. |
| 2015/0053779 A1 | 2/2015 | Adamek et al. |
| 2015/0053780 A1 | 2/2015 | Nelson et al. |
| 2015/0053781 A1 | 2/2015 | Nelson et al. |
| 2015/0058779 A1 | 2/2015 | Bruck et al. |
| 2015/0061859 A1 | 3/2015 | Matsuoka et al. |
| 2015/0066215 A1 | 3/2015 | Buduri |
| 2015/0066216 A1 | 3/2015 | Ramachandran |
| 2015/0066220 A1 | 3/2015 | Sloo et al. |
| 2015/0081106 A1 | 3/2015 | Buduri |
| 2015/0081109 A1 | 3/2015 | Fadell et al. |
| 2015/0088272 A1 | 3/2015 | Drew |
| 2015/0088318 A1 | 3/2015 | Amundson et al. |
| 2015/0100166 A1 | 4/2015 | Baynes et al. |
| 2015/0100167 A1 | 4/2015 | Sloo et al. |
| 2015/0114080 A1* | 4/2015 | Berg ............... F25B 49/022 73/1.57 |
| 2015/0115045 A1 | 4/2015 | Tu et al. |
| 2015/0115046 A1 | 4/2015 | Warren et al. |
| 2015/0124853 A1 | 5/2015 | Huppi et al. |
| 2015/0127176 A1 | 5/2015 | Bergman et al. |
| 2015/0140994 A1 | 5/2015 | Partheesh et al. |
| 2015/0142180 A1 | 5/2015 | Matsuoka et al. |
| 2015/0144706 A1 | 5/2015 | Robideau et al. |
| 2015/0148963 A1 | 5/2015 | Klein et al. |
| 2015/0153057 A1 | 6/2015 | Matsuoka et al. |
| 2015/0153060 A1 | 6/2015 | Stefanski et al. |
| 2015/0156631 A1 | 6/2015 | Ramachandran |
| 2015/0159893 A1 | 6/2015 | Daubman et al. |
| 2015/0159899 A1 | 6/2015 | Bergman et al. |
| 2015/0159902 A1 | 6/2015 | Quam et al. |
| 2015/0159903 A1 | 6/2015 | Marak et al. |
| 2015/0159904 A1 | 6/2015 | Barton |
| 2015/0160691 A1 | 6/2015 | Kadah et al. |
| 2015/0163945 A1 | 6/2015 | Barton et al. |
| 2015/0167995 A1 | 6/2015 | Fadell et al. |
| 2015/0168002 A1 | 6/2015 | Plitkins et al. |
| 2015/0168003 A1 | 6/2015 | Stefanski et al. |
| 2015/0168933 A1 | 6/2015 | Klein et al. |
| 2015/0176854 A1 | 6/2015 | Butler et al. |
| 2015/0176855 A1 | 6/2015 | Geadelmann et al. |
| 2015/0198346 A1 | 7/2015 | Vedpathak |
| 2015/0198347 A1 | 7/2015 | Tessier et al. |
| 2015/0204558 A1 | 7/2015 | Sartain et al. |
| 2015/0204561 A1 | 7/2015 | Sadwick et al. |
| 2015/0204563 A1 | 7/2015 | Imes et al. |
| 2015/0204564 A1 | 7/2015 | Shah |
| 2015/0204565 A1 | 7/2015 | Amundson et al. |
| 2015/0204569 A1 | 7/2015 | Lorenz et al. |
| 2015/0204570 A1 | 7/2015 | Adamik et al. |
| 2015/0205310 A1 | 7/2015 | Amundson et al. |
| 2015/0219357 A1 | 8/2015 | Stefanski et al. |
| 2015/0233595 A1 | 8/2015 | Fadell et al. |
| 2015/0233596 A1 | 8/2015 | Warren et al. |
| 2015/0234369 A1 | 8/2015 | Wen et al. |
| 2015/0241078 A1 | 8/2015 | Matsuoka et al. |
| 2015/0249605 A1 | 9/2015 | Erickson et al. |
| 2015/0260424 A1 | 9/2015 | Fadell et al. |
| 2015/0267935 A1 | 9/2015 | Devenish et al. |
| 2015/0268652 A1 | 9/2015 | Lunacek et al. |
| 2015/0276237 A1 | 10/2015 | Daniels et al. |
| 2015/0276238 A1 | 10/2015 | Matsuoka et al. |
| 2015/0276239 A1 | 10/2015 | Fadell et al. |
| 2015/0276254 A1 | 10/2015 | Nemcek et al. |
| 2015/0276266 A1 | 10/2015 | Warren et al. |
| 2015/0277463 A1 | 10/2015 | Hazzard et al. |
| 2015/0280935 A1 | 10/2015 | Poplawski et al. |
| 2015/0287310 A1 | 10/2015 | Deiuliis et al. |
| 2015/0292764 A1 | 10/2015 | Land et al. |
| 2015/0292765 A1 | 10/2015 | Matsuoka et al. |
| 2015/0293541 A1 | 10/2015 | Fadell et al. |
| 2015/0300672 A1 | 10/2015 | Fadell et al. |
| 2015/0312696 A1 | 10/2015 | Ribbich et al. |
| 2015/0316285 A1 | 11/2015 | Clifton et al. |
| 2015/0316286 A1 | 11/2015 | Roher |
| 2015/0316902 A1 | 11/2015 | Wenzel et al. |
| 2015/0323212 A1 | 11/2015 | Warren et al. |
| 2015/0327010 A1 | 11/2015 | Gottschalk et al. |
| 2015/0327084 A1 | 11/2015 | Ramachandran et al. |
| 2015/0327375 A1 | 11/2015 | Bick et al. |
| 2015/0330654 A1 | 11/2015 | Matsuoka |
| 2015/0330658 A1 | 11/2015 | Filson et al. |
| 2015/0330660 A1 | 11/2015 | Filson et al. |
| 2015/0332150 A1 | 11/2015 | Thompson |
| 2015/0345818 A1 | 12/2015 | Oh et al. |
| 2015/0348554 A1 | 12/2015 | Orr et al. |
| 2015/0354844 A1 | 12/2015 | Kates |
| 2015/0354846 A1 | 12/2015 | Hales et al. |
| 2015/0355371 A1 | 12/2015 | Ableitner et al. |
| 2015/0362208 A1 | 12/2015 | Novotny et al. |
| 2015/0362927 A1 | 12/2015 | Giorgi |
| 2015/0364135 A1 | 12/2015 | Kolavennu et al. |
| 2015/0370270 A1 | 12/2015 | Pan et al. |
| 2015/0370272 A1 | 12/2015 | Reddy et al. |
| 2015/0370615 A1 | 12/2015 | Pi-Sunyer |
| 2015/0370621 A1 | 12/2015 | Karp et al. |
| 2015/0372832 A1 | 12/2015 | Kortz et al. |
| 2015/0372834 A1 | 12/2015 | Karp et al. |
| 2015/0372999 A1 | 12/2015 | Pi-Sunyer |
| 2016/0006274 A1 | 1/2016 | Tu et al. |
| 2016/0006577 A1 | 1/2016 | Logan |
| 2016/0010880 A1 | 1/2016 | Bravard et al. |
| 2016/0018122 A1 | 1/2016 | Frank et al. |
| 2016/0018127 A1 | 1/2016 | Gourlay et al. |
| 2016/0020590 A1 | 1/2016 | Roosli et al. |
| 2016/0026194 A1 | 1/2016 | Mucignat et al. |
| 2016/0036227 A1 | 2/2016 | Schultz et al. |
| 2016/0040903 A1 | 2/2016 | Emmons et al. |
| 2016/0047569 A1 | 2/2016 | Fadell et al. |
| 2016/0054022 A1 | 2/2016 | Matas et al. |
| 2016/0061471 A1 | 3/2016 | Eicher et al. |
| 2016/0061474 A1 | 3/2016 | Cheung et al. |
| 2016/0069582 A1 | 3/2016 | Buduri |
| 2016/0069583 A1 | 3/2016 | Fadell et al. |
| 2016/0077532 A1 | 3/2016 | Lagerstedt et al. |
| 2016/0088041 A1 | 3/2016 | Nichols |
| 2016/0327298 A1 | 11/2016 | Sinha et al. |
| 2016/0327299 A1 | 11/2016 | Ribbich et al. |
| 2016/0327300 A1 | 11/2016 | Ribbich et al. |
| 2016/0327301 A1 | 11/2016 | Ribbich et al. |
| 2016/0327302 A1 | 11/2016 | Ribbich et al. |
| 2016/0327921 A1 | 11/2016 | Ribbich et al. |
| 2016/0377306 A1 | 12/2016 | Drees et al. |
| 2017/0074536 A1 | 3/2017 | Bentz et al. |
| 2017/0074537 A1 | 3/2017 | Bentz et al. |
| 2017/0074539 A1 | 3/2017 | Bentz et al. |
| 2017/0074541 A1 | 3/2017 | Bentz et al. |
| 2017/0075510 A1 | 3/2017 | Bentz et al. |
| 2017/0075568 A1 | 3/2017 | Bentz et al. |
| 2017/0076263 A1 | 3/2017 | Bentz et al. |
| 2017/0102162 A1 | 4/2017 | Drees et al. |
| 2017/0102433 A1 | 4/2017 | Wenzel et al. |
| 2017/0102434 A1 | 4/2017 | Wenzel et al. |
| 2017/0102675 A1 | 4/2017 | Drees |
| 2017/0103483 A1 | 4/2017 | Drees et al. |
| 2017/0104332 A1 | 4/2017 | Wenzel et al. |
| 2017/0104336 A1 | 4/2017 | Elbsat et al. |
| 2017/0104337 A1 | 4/2017 | Drees |
| 2017/0104342 A1 | 4/2017 | Elbsat et al. |
| 2017/0104343 A1 | 4/2017 | Elbsat et al. |
| 2017/0104344 A1 | 4/2017 | Wenzel et al. |
| 2017/0104345 A1 | 4/2017 | Wenzel et al. |
| 2017/0104346 A1 | 4/2017 | Wenzel et al. |
| 2017/0104449 A1 | 4/2017 | Drees |
| 2017/0122613 A1 | 5/2017 | Sinha et al. |
| 2017/0122617 A1 | 5/2017 | Sinha et al. |
| 2017/0123391 A1 | 5/2017 | Sinha et al. |
| 2017/0124838 A1 | 5/2017 | Sinha et al. |

(56) References Cited

U.S. PATENT DOCUMENTS

| | | | |
|---|---|---|---|
| 2017/0124842 A1 | 5/2017 | Sinha et al. | |
| 2017/0167768 A1* | 6/2017 | Kesselman | F25B 49/02 |
| 2017/0227246 A1* | 8/2017 | Rajan | F24F 11/30 |

FOREIGN PATENT DOCUMENTS

| | | |
|---|---|---|
| CA | 2633121 C | 8/2011 |
| CA | 2818356 | 5/2012 |
| CA | 2818696 A1 | 5/2012 |
| CA | 2853041 | 4/2013 |
| CA | 2853081 A1 | 4/2013 |
| CA | 2812567 | 5/2014 |
| CA | 2886531 A1 | 9/2015 |
| CA | 2894359 A1 | 12/2015 |
| DE | 10 2004 005 962 | 8/2005 |
| EP | 2 283 279 A2 | 2/2011 |
| EP | 2 738 478 | 6/2014 |
| EP | 2 897 018 A1 | 7/2015 |
| EP | 2 988 188 A2 | 2/2016 |
| GB | 2 519 441 A | 4/2015 |
| WO | WO 00/22491 A1 | 4/2000 |
| WO | WO 2006/041599 A9 | 7/2006 |
| WO | WO 2009/006133 A1 | 1/2009 |
| WO | WO 2009/058127 A1 | 5/2009 |
| WO | WO 2009/036764 A3 | 1/2010 |
| WO | WO 2010/059143 A1 | 5/2010 |
| WO | WO 2010/078459 A1 | 7/2010 |
| WO | WO 2010/088663 A1 | 8/2010 |
| WO | WO 2012/042232 | 4/2012 |
| WO | WO 2012/068436 A1 | 5/2012 |
| WO | WO 2012/068495 A1 | 5/2012 |
| WO | WO 2012/068503 A1 | 5/2012 |
| WO | WO 2012/068507 A3 | 5/2012 |
| WO | WO 2012/068517 A1 | 5/2012 |
| WO | WO 2012/068526 A1 | 5/2012 |
| WO | WO 2013/033469 A1 | 3/2013 |
| WO | WO 2013/052389 A1 | 4/2013 |
| WO | WO 2013/052905 A1 | 4/2013 |
| WO | WO 2013/058933 A1 | 4/2013 |
| WO | WO 2013/058934 | 4/2013 |
| WO | WO 2013/058968 A1 | 4/2013 |
| WO | WO 2013/058969 A1 | 4/2013 |
| WO | WO 2013/059684 A1 | 4/2013 |
| WO | WO 2012/142477 A3 | 8/2013 |
| WO | WO 2013/153480 A3 | 12/2013 |
| WO | WO 2014/047501 A1 | 3/2014 |
| WO | WO 2012/068437 A3 | 4/2014 |
| WO | WO 2012/068459 A3 | 4/2014 |
| WO | WO 2013/058932 | 4/2014 |
| WO | WO 2014/051632 A1 | 4/2014 |
| WO | WO 2014/051635 A1 | 4/2014 |
| WO | WO 2014/055059 A1 | 4/2014 |
| WO | WO 2013/052901 A3 | 5/2014 |
| WO | WO 2014/152301 A2 | 9/2014 |
| WO | WO 2014/152301 A3 | 9/2014 |
| WO | WO 2015/012449 | 1/2015 |
| WO | WO 2015/039178 A1 | 3/2015 |
| WO | WO 2015/054272 A2 | 4/2015 |
| WO | WO 2015/057698 A1 | 4/2015 |
| WO | WO 2015/099721 A1 | 7/2015 |
| WO | WO 2015/127499 A1 | 9/2015 |
| WO | WO 2015/127566 A1 | 9/2015 |
| WO | WO 2015/134755 A3 | 10/2015 |
| WO | WO 2015/195772 A1 | 12/2015 |
| WO | WO 2016/038374 A1 | 3/2016 |

OTHER PUBLICATIONS

U.S. Appl. No. 15/338,221, filed Oct. 28, 2016, Johnson Controls Technology Company.
U.S. Appl. No. 29/563,447, filed May 4, 2016, Johnson Controls Technology Company.
U.S. Appl. No. 29/576,515, filed Sep. 2, 2016, Johnson Controls Technology Company.
U.S. Appl. No. 62/239,131, filed Oct. 8, 2015, Johnson Controls Technology Company.
U.S. Appl. No. 62/239,231, filed Oct. 8, 2015, Johnson Controls Technology Company.
U.S. Appl. No. 62/239,233, filed Oct. 8, 2015, Johnson Controls Technology Company.
U.S. Appl. No. 62/239,245, filed Oct. 8, 2015, Johnson Controls Technology Company.
U.S. Appl. No. 62/239,246, filed Oct. 8, 2015, Johnson Controls Technology Company.
U.S. Appl. No. 62/239,249, filed Oct. 8, 2015, Johnson Controls Technology Company.
Unknown, National Semiconductor's Temperature Sensor Handbook, Nov. 1, 1997, retrieved from the Internet at http://shrubbery.net/~heas/willem/PDF/NSC/temphb.pdf on Aug. 11, 2016, pp. 1-40.
Search Report for International Application No. PCT/US2016/030291, dated Sep. 7, 2016, 11 pages.
Search Report for International Application No. PCT/US2016/030827 dated Sep. 7, 2016, 13 pages.
Search Report for International Application No. PCT/US2016/030829, dated Sep. 7, 2016, 15 pages.
Search Report for International Application No. PCT/US2016/030835, dated Sep. 7, 2016, 13 pages.
Search Report for International Application No. PCT/US2016/030836, dated Sep. 7, 2016, 11 pages.
Search Report for International Application No. PCT/US2016/030837, dated Sep. 7, 2016, 13 pages.
Search Report for International Application No. PCT/US2016/051176, dated Feb. 16, 2017, 20 pages.
Search Report for International Application No. PCT/US2017/012217, dated Mar. 31, 2017, 14 pages.
Search Report for International Application No. PCT/US2017/012218, dated Mar. 31, 2017, 14 pages.
Search Report for International Application No. PCT/US2017/012221, dated Mar. 31, 2017, 13 pages.

* cited by examiner

SYSTEMS AND METHODS FOR TEMPERATURE AND HUMIDITY CONTROL

CROSS-REFERENCE TO RELATED PATENT APPLICATION

This application claims the benefit of and priority to U.S. Provisional Patent Application No. 62/367,358 filed Jul. 27, 2016, U.S. Provisional Patent Application No. 62/367,315 filed Jul. 27, 2016, U.S. Provisional Patent Application No. 62/367,576 filed Jul. 27, 2016, and U.S. Provisional Patent Application No. 62/367,572 filed Jul. 27, 2016. The entire disclosure of each of these patent applications is incorporated by reference herein.

BACKGROUND

Residential heating ventilation and air conditioning (HVAC) systems include many components which must work together to provide heating or cooling to a residential structure. Often, the individual components, such as compressors, fans, and valves, require individual sensors or other devices to ensure that the components are operating at a proper operating point based on one or more parameters associated with the HVAC system. This can require an HVAC system to either use simple control components to allow for basic HVAC system control, which can result in HVAC systems with limited functionality and efficiency. Conversely, an HVAC system having additional functionality require multiple sensors and other devices to determine the operational values for multiple components within the HVAC system resulting in additional cost and complexity of the HVAC system.

SUMMARY

One implementation of the present disclosure is a residential HVAC system. The system includes a compressor, and an outdoor unit controller in communication with the compressor. The outdoor unit controller is configured to receive an indoor ambient temperature and a temperature set point. The outdoor unit controller is further configured to determine an outdoor ambient temperature, and to determine an operating value for the compressor based on a percentage of a delta between a minimum operating value of the compressor and a maximum operating value of the compressor, plus the minimum operating value. The minimum operating value and the maximum operating value are based on the determined outdoor ambient temperature. The percentage of the delta is based on a predefined temperature differential multiplier and one or more time dependent multipliers. The outdoor unit controller is further configured to modify the current operating value of the compressor with the determined operating value.

Another implementation of the present disclosure is a method for modifying one or more operational values of a residential HVAC system. The method includes monitoring an indoor ambient temperature of a residential building, and comparing the indoor ambient temperature to a defined temperature set point. The method further includes calculating an operational value for one or more components of the residential HVAC system based on a percentage of a delta between a minimum operating value for the components and a maximum operating value of the components plus a minimum operating value. The minimum operating value and the maxim operating value are based on the determined outdoor ambient temperature. The percentage of the delta is based on a predefined temperature multiplier and one or more time dependent multipliers. The method further includes modifying the current operating values of the components with the determined operating values.

Another implementation of the present disclosure is an outdoor unit of a residential HVAC system. The outdoor unit includes a compressor and an outdoor unit controller in communication with the compressor. The outdoor unit controller is configured to receive an indoor ambient temperature and a temperature set point, and to determine an outdoor ambient temperature. The outdoor unit controller is further configured to calculate an operating value for the compressor based on a percentage of a delta between a minimum operating value for the compressor and a maximum operating value for the compressor plus the minimum operating value. The minimum operating value and the maximum operating value are based on the determined outdoor ambient temperature. The percentage of the delta is based on a predefined temperature differential multiplier and one or more time dependent multipliers using the equation $\pm A \%/T_c(+B \%/D_{min}$ when $T[0] \geq T[D_{min}]$; or $-C \%/D_{min}$ when $T[0]<T[D_{min}]$). Wherein A is the temperature differential multiplier, and B and C are the time dependent multipliers. $T_c$ is a difference between the indoor ambient temperature and the temperature set point, and $D_{min}$ is a time value. The outdoor unit controller is further configured to modify a current operating value of the compressor with the calculated operating value.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Referring generally to FIGURES, and specification, systems and methods for providing temperature and humidity control are shown, according to various exemplary embodiments. The following systems and methods utilize an outdoor ambient temperature to provide a common operating value calculation for multiple components within the system by instructing the components to operate at a defined percentage of the delta between each component's minimum and maximum operating points. This reduces the need for additional sensors and components, as well as increases the simplicity of the control scheme by allowing for a common control scheme to be provided for multiple components that does not require each component to be individually evaluated during operation. This provides a technical solution to the HVAC centric challenge of simplifying the control of an HVAC system while still providing for efficient and effecting functioning of the HVAC system.

Figure 1:
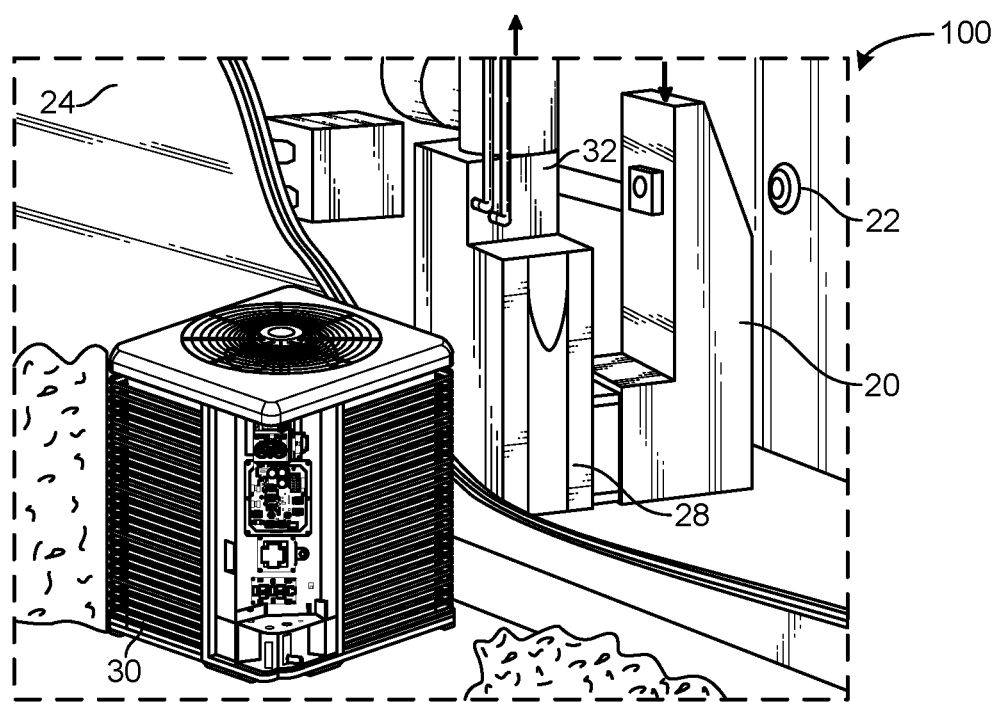
FIG. 1 is a schematic drawing of a building equipped with a residential heating and cooling system, according to an exemplary embodiment.

FIG. 1 illustrates a residential heating and cooling system 100, such as an HVAC system. The residential heating and cooling system 100 may provide heated and cooled air to a residential structure. Although described as a residential heating and cooling system 100, embodiments of the systems and methods described herein can be utilized in a cooling unit or a heating unit in a variety of applications include commercial HVAC units (e.g., roof top units). In general, a residence 24 includes refrigerant conduits that operatively couple an indoor unit 28 to an outdoor unit 30. Indoor unit 28 may be positioned in a utility space, an attic, a basement, and so forth. Outdoor unit 30 is situated adjacent to a side of residence 24. Refrigerant conduits transfer refrigerant between indoor unit 28 and outdoor unit 30, typically transferring primarily liquid refrigerant in one direction and primarily vaporized refrigerant in an opposite direction.

When the system 100 shown in FIG. 1 is operating as an air conditioner, a coil in outdoor unit 30 serves as a condenser for recondensing vaporized refrigerant flowing from indoor unit 28 to outdoor unit 30 via one of the refrigerant conduits. In these applications, a coil of the indoor unit 28, designated by the reference numeral 32, serves as an evaporator coil. Evaporator coil 32 receives liquid refrigerant (which may be expanded by an expansion device, not shown) and evaporates the refrigerant before returning it to outdoor unit 30.

Outdoor unit 30 draws in environmental air through its sides as indicated by the arrows directed to the sides of the unit, forces the air through the outer unit coil using a fan, and expels the air. When operating as an air conditioner, the air is heated by the condenser coil within the outdoor unit 30 and exits the top of the unit at a temperature higher than it entered the sides. Air is blown over indoor coil 32 and is then circulated through residence 24 by means of ductwork 20, as indicated by the arrows entering and exiting ductwork 20. The overall system 100 operates to maintain a desired temperature as set by thermostat 22. When the temperature sensed inside the residence 24 is higher than the set point on the thermostat 22 (with the addition of a relatively small tolerance), the air conditioner will become operative to refrigerate additional air for circulation through the residence 24. When the temperature reaches the set point (with the removal of a relatively small tolerance), the unit can stop the refrigeration cycle temporarily.

In some embodiments, the system 100 configured so that the outdoor unit 30 is controlled to achieve a more elegant control over temperature and humidity within the residence 24. The outdoor unit 30 is controlled to operate components within the outdoor unit 30, and the system 100, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

Figure 2:
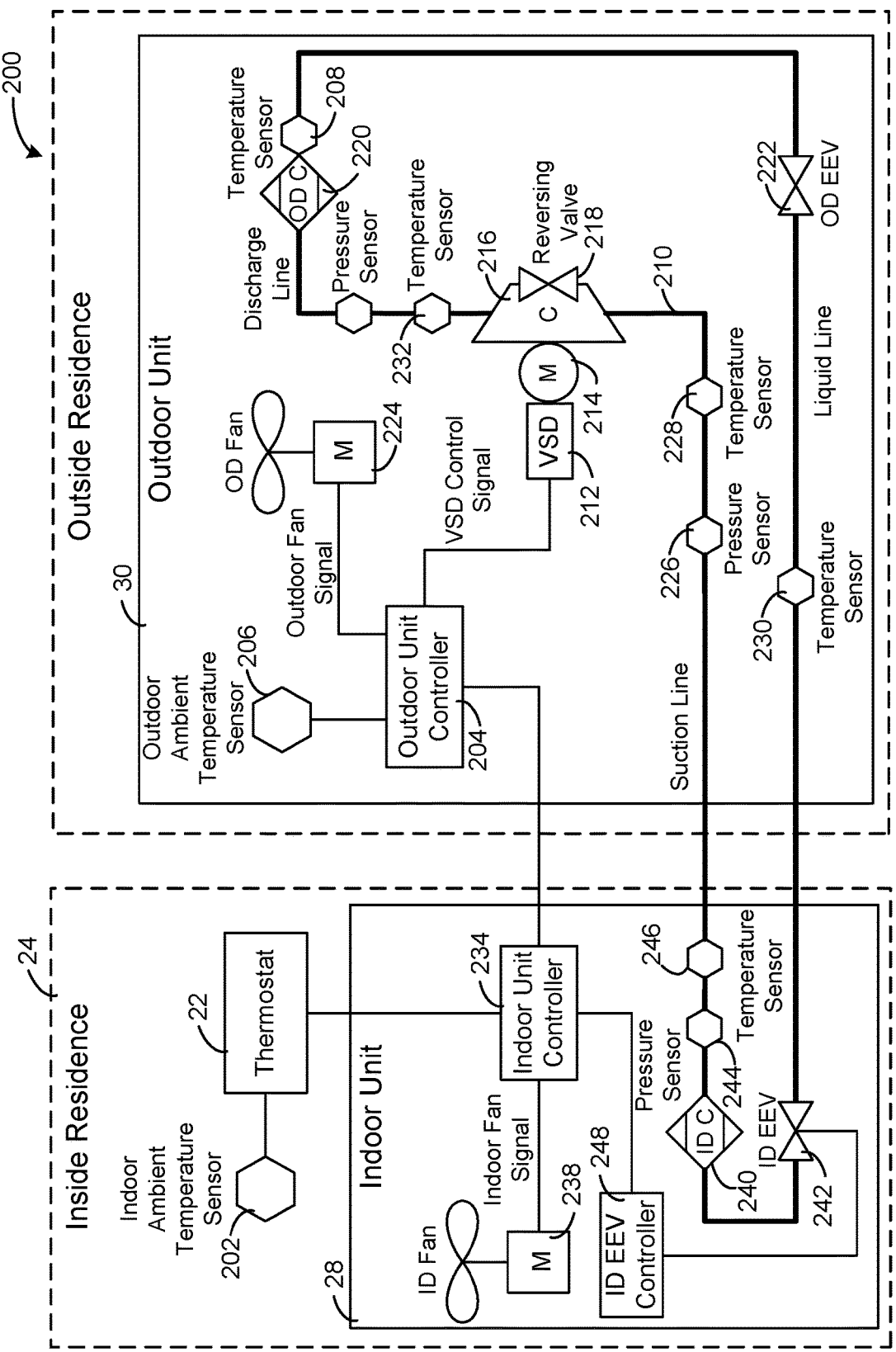
FIG. 2 is a schematic drawing of an indoor unit, an outdoor unit, and a refrigeration line of a residential heating and cooling system, according to an exemplary embodiment.

Referring now to FIG. 2, an HVAC system 200 is shown according to an exemplary embodiment. Various components of system 300 are located inside residence 24 while other components are located outside residence 24. Outdoor unit 30, as described with reference to FIG. 1, is shown to be located outside residence 24 while indoor unit 28 and thermostat 22, as described with reference to FIG. 1, are shown to be located inside the building. In various embodiments, the thermostat 22 can cause the indoor unit 28 and the outdoor unit 30 to heat residence 24. In some embodiments, the thermostat 22 can cause the indoor unit 28 and the outdoor unit 30 to cool the residence 24. In other embodiments, the thermostat 22 can command an airflow change within the residence 24 to adjust the humidity within the residence 24.

Thermostat 22 can be configured to generate control signals for indoor unit 28 and/or outdoor unit 30. The thermostat 22 is shown to be connected to an indoor ambient temperature sensor 202, and an outdoor unit controller 204 is shown to be connected to an outdoor ambient temperature sensor 206. The indoor ambient temperature sensor 202 and the outdoor ambient temperature sensor 206 may be any kind of temperature sensor (e.g., thermistor, thermocouple, etc.). The thermostat 22 may measure the temperature of residence 24 via the indoor ambient temperature sensor 202. Further, the thermostat 22 can be configured to receive the temperature outside residence 24 via communication with the outdoor unit controller 204. In various embodiments, the thermostat 22 generates control signals for the indoor unit 28 and the outdoor unit 30 based on the indoor ambient temperature (e.g., measured via indoor ambient temperature sensor 202), the outdoor temperature (e.g., measured via the outdoor ambient temperature sensor 206), and/or a temperature set point.

The indoor unit 28 and the outdoor unit 30 may be electrically connected. Further, indoor unit 28 and outdoor unit 30 may be coupled via conduits 210. The outdoor unit 30 can be configured to compress refrigerant inside conduits 210 to either heat or cool the building based on the operating mode of the indoor unit 28 and the outdoor unit 30 (e.g., heat pump operation or air conditioning operation). The refrigerant inside conduits 210 may be any fluid that absorbs and extracts heat. For example, the refrigerant may be hydro fluorocarbon (HFC) based R-410A, R-407C, and/or R-134a.

The outdoor unit 30 is shown to include the outdoor unit controller 204, a variable speed drive 212, a motor 214 and a compressor 216. The outdoor unit 30 can be configured to control the compressor 216 and to further cause the compressor 216 to compress the refrigerant inside conduits 210. In this regard, the compressor 216 may be driven by the variable speed drive 212 and the motor 214. For example, the outdoor unit controller 204 can generate control signals for the variable speed drive 212. The variable speed drive 212 (e.g., an inverter, a variable frequency drive, etc.) may be an AC-AC inverter, a DC-AC inverter, and/or any other type of inverter. The variable speed drive 212 can be configured to vary the torque and/or speed of the motor 214 which in turn drives the speed and/or torque of compressor 216. The compressor 216 may be any suitable compressor such as a screw compressor, a reciprocating compressor, a rotary compressor, a swing link compressor, a scroll compressor, or a turbine compressor, etc.

In some embodiments, the outdoor unit controller 204 is configured to process data received from the thermostat 22 to determine operating values for components of the system 100, such as the compressor 216. In one embodiment, the outdoor unit controller 204 is configured to provide the determined operating values for the compressor 216 to the variable speed drive 212, which controls a speed of the compressor 216. The outdoor unit controller 204 is controlled to operate components within the outdoor unit 30, and the indoor unit 28, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

In some embodiments, the outdoor unit controller 204 can control a reversing valve 218 to operate system 200 as a heat pump or an air conditioner. For example, the outdoor unit controller 204 may cause reversing valve 218 to direct compressed refrigerant to the indoor coil 32 while in heat pump mode and to an outdoor coil 220 while in air conditioner mode. In this regard, the indoor coil 32 and the outdoor coil 220 can both act as condensers and evaporators depending on the operating mode (i.e., heat pump or air conditioner) of system 200.

Further, in various embodiments, outdoor unit controller 204 can be configured to control and/or receive data from an outdoor electronic expansion valve (EEV) 222. The outdoor electronic expansion valve 222 may be an expansion valve controlled by a stepper motor. In this regard, the outdoor unit controller 204 can be configured to generate a step signal (e.g., a PWM signal) for the outdoor electronic expansion valve 222. Based on the step signal, the outdoor electronic expansion valve 222 can be held fully open, fully closed, partial open, etc. In various embodiments, the outdoor unit controller 204 can be configured to generate step signal for the outdoor electronic expansion valve 222 based on a subcool and/or superheat value calculated from various temperatures and pressures measured in system 200. In one embodiment, the outdoor unit controller 204 is configured to control the position of the outdoor electronic expansion valve 222 based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The outdoor unit controller 204 can be configured to control and/or power outdoor fan 224. The outdoor fan 224 can be configured to blow air over the outdoor coil 220. In this regard, the outdoor unit controller 204 can control the amount of air blowing over the outdoor coil 220 by generating control signals to control the speed and/or torque of outdoor fan 224. In some embodiments, the control signals are pulse wave modulated signals (PWM), analog voltage signals (i.e., varying the amplitude of a DC or AC signal), and/or any other type of signal. In one embodiment, the outdoor unit controller 204 can control an operating value of the outdoor fan 224, such as speed, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The outdoor unit 30 may include one or more temperature sensors and one or more pressure sensors. The temperature sensors and pressure sensors may be electrical connected (i.e., via wires, via wireless communication, etc.) to the outdoor unit controller 204. In this regard, the outdoor unit controller 204 can be configured to measure and store the temperatures and pressures of the refrigerant at various locations of the conduits 210. The pressure sensors may be any kind of transducer that can be configured to sense the pressure of the refrigerant in the conduits 210. The outdoor unit 30 is shown to include pressure sensor 226. The pressure sensor 226 may measure the pressure of the refrigerant in conduit 210 in the suction line (i.e., a predefined distance from the inlet of compressor 216. Further, the outdoor unit 30 is shown to include pressure sensor 226. The pressure sensor 226 may be configured to measure the pressure of the refrigerant in conduits 210 on the discharge line (e.g., a predefined distance from the outlet of compressor 216).

The temperature sensors of outdoor unit 30 may include thermistors, thermocouples, and/or any other temperature sensing device. The outdoor unit 30 is shown to include temperature sensor 208, temperature sensor 228, temperature sensor 230, and temperature sensor 232. The temperature sensors (i.e., temperature sensor 208, temperature sensor 228, temperature sensor 230, and/or temperature sensor 232) can be configured to measure the temperature of the refrigerant at various locations inside conduits 210.

Referring now to the indoor unit 28, the indoor unit 28 is shown to include indoor unit controller 234, indoor electronic expansion valve controller 236, an indoor fan 238, an indoor coil 240, an indoor electronic expansion valve 242, a pressure sensor 244, and a temperature sensor 246. The indoor unit controller 234 can be configured to generate control signals for indoor electronic expansion valve controller 248. The signals may be set points (e.g., temperature set point, pressure set point, superheat set point, subcool set point, step value set point, etc.). In this regard, indoor electronic expansion valve controller 248 can be configured to generate control signals for indoor electronic expansion valve 242. In various embodiments, indoor electronic expansion valve 242 may be the same type of valve as outdoor electronic expansion valve 222. In this regard, indoor electronic expansion valve controller 248 can be configured to generate a step control signal (e.g., a PWM wave) for controlling the stepper motor of the indoor electronic expansion valve 242. In this regard, indoor electronic expansion valve controller 248 can be configured to fully open, fully close, or partially close the indoor electronic expansion valve 242 based on the step signal.

Indoor unit controller 234 can be configured to control indoor fan 238. The indoor fan 238 can be configured to blow air over indoor coil 32. In this regard, the indoor unit controller 234 can control the amount of air blowing over the indoor coil 240 by generating control signals to control the speed and/or torque of the indoor fan 238. In some embodiments, the control signals are pulse wave modulated signals (PWM), analog voltage signals (i.e., varying the amplitude of a DC or AC signal), and/or any other type of signal. In one embodiment, the indoor unit controller 234 may receive a signal from the outdoor unit controller indicating one or more operating values, such as speed for the indoor fan 238. In one embodiment, the operating value associated with the indoor fan 238 is an airflow, such as cubic feet per minute (CFM). In one embodiment, the outdoor unit controller 204 may determine the operating value of the indoor fan based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The indoor unit controller 234 may be electrically connected (e.g., wired connection, wireless connection, etc.) to pressure sensor 244 and/or temperature sensor 246. In this regard, the indoor unit controller 234 can take pressure and/or temperature sensing measurements via pressure sensor 244 and/or temperature sensor 246. In one embodiment, pressure sensor 244 and temperature sensor 246 are located on the suction line (i.e., a predefined distance from indoor coil 32). In other embodiments, the pressure sensor 244 and/or the temperature sensor 246 may be located on the liquid line (i.e., a predefined distance from indoor coil 32).

Figure 3:
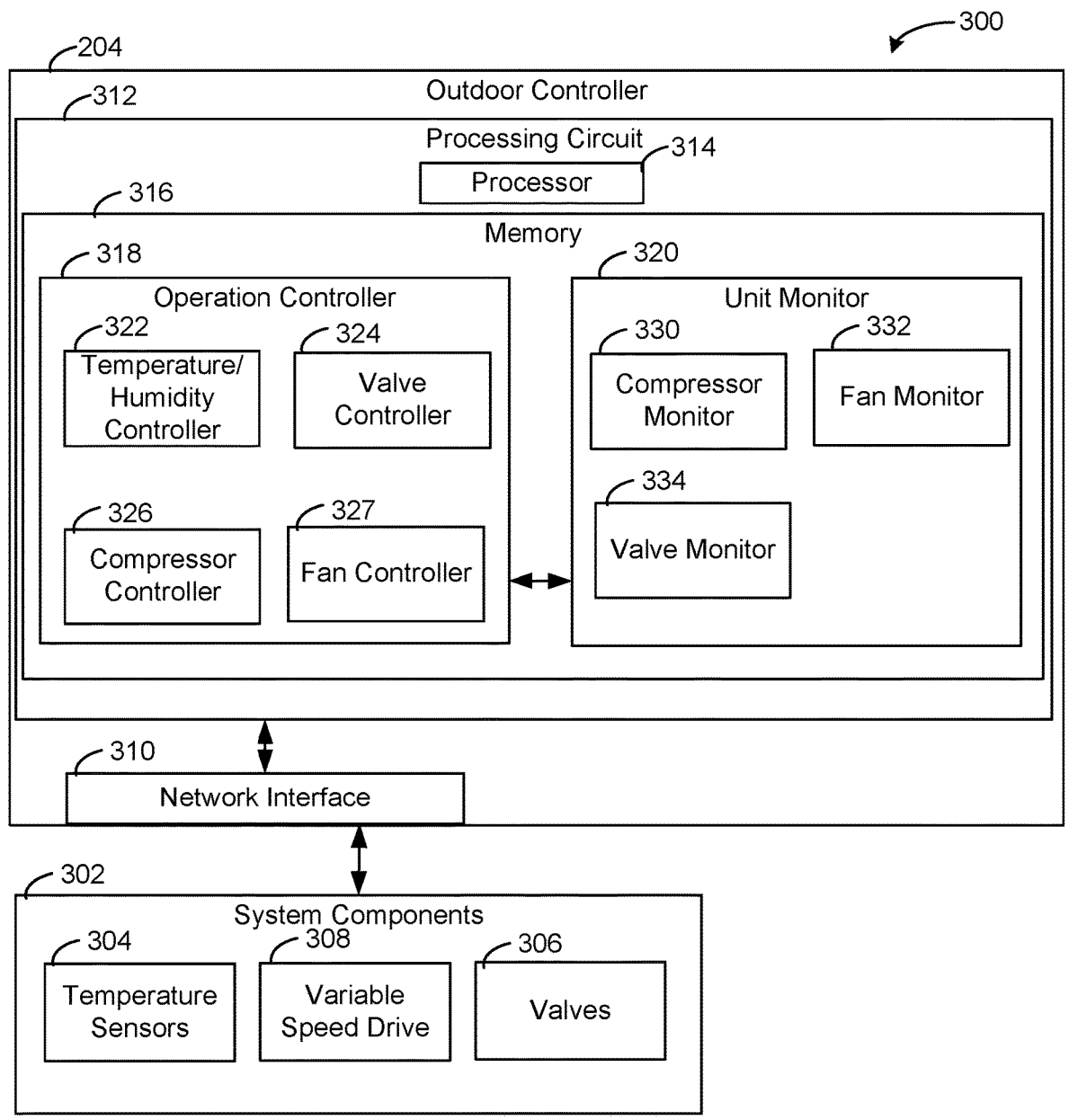
FIG. 3 is a block diagram of a controller of the outdoor unit of FIG. 3, according to an exemplary embodiment.

Referring now to FIG. 3, a block diagram 300 showing outdoor unit controller 204 in greater detail is shown, according to some embodiments. The outdoor unit controller 204 is configured to generate control signals for system components 302 and monitor the status of the system components 302. In various embodiments, the system components 302 include and/or are the system components of system 200 as described with reference to FIG. 2.

System components 302 are shown to include one or more temperature sensors 304, one or more valves 306, and a variable speed drive 308. In various embodiments temperature sensors 304 include and/or are ambient temperature sensors for sensing indoor and outdoor ambient temperatures as described in FIG. 2, above. In this regard, the temperature of the suction line, the liquid line, the discharge line, and the outdoor coil can be measured by the outdoor unit controller 204 via the temperature sensors 304. The valves 306 may include electronic expansion valves and/or reversing valves as described with reference to FIG. 2. In this regard, the outdoor unit controller 204 can be configured to generate control signals for the electronic expansion valve 222 and/or the reversing valve 218.

The outdoor controller 204 is shown to include a network interface 310. In this regard, outdoor controller 204 can be configured to communicate with thermostat 22 or other network connected device. In one embodiment, the network interface 310 can be configured to receive operating commands from thermostat 22 and distribute the operating command to various components of the outdoor unit controller 204. In various embodiments, network interface 310 can be configured to send various calculated and/or measured system status variables to the thermostat 22.

In FIG. 3, outdoor controller 204 is shown to include processing circuit 312. Processing circuit 312 is shown to include a processor 314 and memory 316. Processor 314 can be a general purpose or specific purpose processor, an application specific integrated circuit (ASIC), one or more field programmable gate arrays (FPGAs), a group of processing components, or other suitable processing components. Processor 314 may be configured to execute computer code and/or instructions stored in memory 316 or received from other computer readable media (e.g., CDROM, network storage, a remote server, etc.).

Memory 316 can include one or more devices (e.g., memory units, memory devices, storage devices, etc.) for storing data and/or computer code for completing and/or facilitating the various processes described in the present disclosure. Memory 316 can include random access memory (RAM), read-only memory (ROM), hard drive storage, temporary storage, non-volatile memory, flash memory, optical memory, or any other suitable memory for storing software objects and/or computer instructions. Memory 316 can include database components, object code components, script components, or any other type of information structure for supporting the various activities and information structures described in the present disclosure. Memory 316 can be communicably connected to processor 314 via processing circuit 312 and can include computer code for executing (e.g., by processor 314) one or more processes described herein.

Memory 424 is shown to include an operation controller 318 and a unit monitor 320. In some embodiments, the operation controller 318 and/or the unit monitor 320 and each units respective components may be software modules. In various embodiments, the operation controller 318 and the unit monitor 320 are and or include an individual processing device and/or memory device. The operation controller 318 can be configured to generate control signals for system components 302. The operation controller 318 may cause system components 302 to heat and/or cool residence 24, as described with reference to FIG. 1.

The operation controller 318 is shown to include a temperature/humidity controller 322, a valve controller 324, a compressor controller 326, and a fan controller 327. The temperature/humidity controller 322 can be configured to operate system components 302 to meet various temperature and/or humidity set points. The valve controller 324 can be configured to control valves such as the outdoor electronic expansion valve 222 and the reversing valve 218. In this regard, valve controller 324 can be configured to operate reversing valve 218 to cause system 200 of FIG. 2 to operate as a heat pump and/or an air conditioner. Further, valve controller 324 can be configured to operate electronic expansion valve 222 to achieve a desired subcool and/or superheat value. The compressor controller 326 is configured to control the compressor, such as compressor 216. In one embodiment, the compressor controller 326 receives operational values from the temperature/humidity controller 322, and control the compressor 216 based on the received operational values. The fan controller 327 is configured to control one or more fans, such as indoor fan 238 and/or outdoor fan 224. In one embodiment, the fan controller 327 receives operational values from the temperature/humidity controller 322, and control the one or more fans based on the received operational values. For example, the fan controller 327 may receive an operational value of speed for the outdoor fan 224, and an operational value of CFM for the indoor fan 238.

Regarding the unit monitor 320, the unit monitor 320 is shown to include a compressor monitor 330, a fan monitor 332, and a valve monitor 334. The compressor monitor 330 can be configured to determine the current operating status of the variable speed drive 212, the motor 214, and/or the compressor 216 of the outdoor unit 30. In this regard, the compressor monitor 330 can be configured to monitor the amount of power sourced by variable speed drive 212 to determine the speed of the compressor 216. In various embodiments, the compressor monitor 330 may monitor a tachometer, an encoder, and/or any other meter for determining the speed of a motor to determine the speed of the compressor 216.

In some embodiments, the fan monitor 332 can be configured to monitor the airflow and/or fan speed of the outdoor fan 224. In various embodiments, the fan monitor 332 can be configured to measure the air flow of outdoor fan 224. The valve monitor 334 can be configured to determine the step value of the one or more valves 306. In various embodiments, the valve monitor 334 determines the step value of valves 306 by communicating with the valve controller 324. In some embodiments, the valve monitor 334 communicates with various feedback sensors of valves 306 to determine the current position and/or step value of the valves 306.

As described above, the thermostat 22 may be able to communicate with the outdoor unit controller 204. For example, the thermostat 22 may transmit a "call" to the outdoor unit controller 204, instructing the outdoor unit controller 204 to perform one or more operations. For example, the thermostat 22 may transmit a call to the outdoor unit controller 204 to initiate a cooling operation. In other examples, the thermostat 22 may transmit a call to the outdoor unit controller 204 to initiate a heating operation. The thermostat 22 can also provide additional data to the outdoor unit controller 204, such as a desired operation mode (e.g. normal, efficiency, and comfort), an ambient indoor temperature, an indoor humidity level, or other required information to perform the desired operations.

In one embodiment, the outdoor unit controller 204 may transmit data received from the thermostat 22 to the temperature/humidity controller 322. The temperature/humidity controller 322 may be configured to establish operating values for multiple components within the system 100. In one embodiment, the temperature/humidity controller 322 may be configured to establish various operating values for system 100 components, including the compressor 216, the outdoor fan 224, and the indoor fan 238, as described above. In addition, the temperature/humidity controller 322 may be able to establish other system parameters such as superheat set points, and/or electronic expansion valve start positions. In one embodiment, the temperature/humidity controller 322 is configured to calculate operational values for one or more components within the system 100 using one or more control algorithms. For example, the temperature/humidity controller 322 may be configured to operate one or more components within a predefined operating envelope. The operating envelope may allow the temperature/humidity controller 322 to control one or more components to operate between a minimum operational value and a maximum operational value. For example, the compressor 216 may have a minimum operational speed and a maximum operational speed. The temperature/humidity controller 322 may then operate the compressor 216 at a speed between the minimum speed and the maximum speed.

In one embodiment, the minimum and maximum operational values are dependent on an outdoor ambient temperature ("OAT"). For example, the minimum and maximum compressor speeds may vary as the OAT increases. The operational minimum and maximum values at varying outdoor ambient temperatures are shown below in Tables 1 and 2. The below values are shown for a standard four-ton HVAC system. However, the values are for example purposes only, and should not be considered as limiting, as the described control mechanism described herein are applicable across multiple HVAC system sizes and types.

TABLE 1

Maximum Operating Values
Maximum Values

| OAT | Compressor Speed | OD Fan Speed | ID Blower Speed | EEV Set point | Evaporator Superheat Set point | Capacity |
|---|---|---|---|---|---|---|
| 35 | 3300 | 365 | 1600 | 260 | 3 | 48000 |
| 45 | 3300 | 525 | 1600 | 260 | 3 | 48000 |
| 55 | 3300 | 750 | 1600 | 260 | 3 | 48000 |
| 65 | 3410 | 837 | 1600 | 260 | 3 | 48000 |

TABLE 1-continued

Maximum Operating Values
Maximum Values

| OAT | Compressor Speed | OD Fan Speed | ID Blower Speed | EEV Set point | Evaporator Superheat Set point | Capacity |
|---|---|---|---|---|---|---|
| 75 | 3590 | 875 | 1600 | 260 | 3 | 48000 |
| 85 | 3873 | 913 | 1600 | 260 | 3 | 48000 |
| 90 | 4014 | 931 | 1600 | 260 | 3 | 48000 |
| 95 | 4155 | 950 | 1600 | 260 | 3 | 48000 |
| 105 | 4450 | 988 | 1600 | 260 | 3 | 48000 |
| 115 | 4950 | 1025 | 1600 | 255 | 3 | 48000 |
| 120 | 5000 | 1025 | 1521 | 255 | 3 | 45633 |
| 125 | 4580 | 1025 | 1442 | 255 | 4 | 43266 |

TABLE 2

Minimum Operating Values
Minimum Values

| OAT | Compressor Speed | OD Fan Speed | ID Blower Speed | EEV Set point | Evaporator Superheat Set point | Capacity |
|---|---|---|---|---|---|---|
| 35 | 1860 | 200 | 973 | 325 | 7 | 29178 |
| 45 | 1430 | 200 | 732 | 325 | 8 | 21962 |
| 55 | 900 | 300 | 485 | 325 | 8 | 14500 |
| 65 | 1013 | 338 | 485 | 325 | 8 | 14500 |
| 75 | 1080 | 375 | 485 | 325 | 8 | 14500 |
| 85 | 1227 | 433 | 530 | 325 | 8 | 15887 |
| 90 | 1300 | 461 | 550 | 325 | 8 | 16504 |
| 95 | 1580 | 525 | 650 | 325 | 7 | 19547 |
| 105 | 2140 | 636 | 815 | 330 | 7 | 24457 |
| 115 | 2700 | 749 | 984 | 330 | 6 | 29517 |
| 125 | 3260 | 817 | 1052 | 330 | 5 | 31569 |

In one embodiment, the temperature/humidity controller 322 is further configured to calculate an appropriate output for each of the above components or parameters based upon a percentage of the delta between the minimum operational values and the maximum operational values. This allows each component to be controlled similarly based on the OAT. The operational output equation (Equation 1) is shown below.

$$(Max-Min) * x\% + Min = Target\ Value$$

Equation 1

For Equation 1, above, Max is the maximum operating value for a component of the system 100, Min is the minimum operating value for the component of the system 100, and x % is the output of an operating algorithm. The operating algorithm is used to determine a percentage of the delta between the minimum operating values and the maximum operating values of one or more components. The operating algorithm may be expressed as the following equation:

$$x\% = \pm A\%/T_c (+B\%/D_{min}\ \text{when}\ T[0] \geq T[D_{min}];\ \text{or}\ -C\%/D_{min}\ \text{when}\ T[0] < T[D_{min}])$$

Equation 2

In Equation 2, $T_c$ is a temperature difference between a set point of the system 100 and a measured indoor ambient temperature. The set point may be a set point temperature provided by a user of the system 100. In one embodiment, the set point is provided by the thermostat 22. In one example, the indoor ambient temperature is provided to the temperature/humidity controller 322 by the thermostat 22, to allow the temperature/humidity controller 322 determine $T_c$. However, in some embodiments, $T_c$ may be provided to the temperature/humidity controller 322 directly from the thermostat 22. In one example, $T_c$ may be 0.1°. However, $T_c$ may be more than 0.1° or less than 0.1°. In some embodiments, $T_c$ is a temperature above a deadband temperature. A deadband temperature may be a defined band of temperature variation from a set point temperature where the system does not request additional heating or cooling. In some examples the deadband temperature may be selected by a user via the thermostat 22. In one embodiment, the deadband range can be ±0.5° to ±2.0° from the set point. However, in other examples the deadband range can be greater than ±0.5° to ±2.0° or less than ±0.5° to ±2.0°.

As used in Equation 2, A % is a predefined temperature differential multiplier expressed as a percentage. Thus, the temperature/humidity controller 322 makes an A % change in the operational value for specified components for every $T_c$ change in the indoor ambient temperature. In one example, the default value for A may be 10%. However, the value of A may be dependent on the operating mode of the system 100. For example, where the system 100 is operating in an efficiency mode, the default value for A may be 10% to require less increase in operating values to achieve the desired set point. However, in other modes, such as a normal mode, the default value for A may be 20%. In one embodiment, the value for A is determined based on the size and type of system that is being controlled.

As also used in Equation 2, there are shown two time-dependent multipliers, B and C. Time-dependent multiplier B is used to instruct the temperature/humidity controller 322 to make an increase of B % in one or more operational values when the temperature is moving further from the set point or if the temperature is staying at a constant level above the set point, after a period of time. Conversely, time dependent multiplier C is used to instruct the temperature/humidity controller 322 to make a decrease of C % in one or more operational values when the temperature is moving closer to the set point. B and C are predefined values that are set by the manufacturer, based on data associated with the system 100. For example, B and C may be based on a size of the system 100. In one example, B may be 8% and C may be 5% for normal operation. However, B may be more than 8% or less than 8%. Similarly, C may be more than 5% or less than 5%.

Both B and C are time-dependent on a time-slope constant D. The time-slope constant D is used to calculate $D_{min}$, which varies based on how far the indoor ambient temperature is away from the set point temperature, as shown below in Equation 3. The time-slope constant D may be a predefined value that is determined based on empirical testing on various systems. In one embodiment, the time-slope constant D is equal to four; however, D may be equal to a value more than four, or a value less than four. Further, the time-slope constant D may vary based on the type of system, size of system, or other variable.

$$D_{Min}=D/(\text{indoor ambient temperature}-\text{set point temperature}); \text{ where } D_{min}\geq 1 \text{ minute}$$

Equation 3

Using the above equations, operating values can be provided to multiple components within the system 100, to allow for the components to operate at an operational value configured to accomplish the desired results, with minimum sensors or other devices required to determine an ideal operational value for each component. Additionally, some components may have additional variables which may be used when determining an appropriate operating value. For example, where the component is the indoor fan 238, the operating airflow value (e.g. CFM) may be determined using the above equations. However, the operating airflow value may further be adjusted based on other settings. In one embodiment, the determined operating airflow value for the indoor fan 238 is further adjusted up or down based on a dehumidifier setting. In another embodiment, the determined operating airflow value for the indoor fan 238 is further adjusted up or down based on an airflow setting for the indoor fan 238. The dehumidifier signal and/or airflow setting may be set in the thermostat 22. In one embodiment, the thermostat 22 provides the dehumidifier and/or airflow signal to the temperature/humidity controller 322 for processing. Accordingly, the temperature/humidity controller 322 can determine the operating value (e.g. operating airflow value) for the indoor fan 238 using the above equations, and then further adjusting the operating value for the indoor fan 238 based on the dehumidifier and/or airflow settings provided by the thermostat 22.

The above examples may be used during a setback cycle of the system. A setback cycle is defined as an offset temperature larger than a minimum offset. In one example, there are two modes available for a setback cycle, comfort or efficiency. In comfort mode, a setback cycle shall begin with the compressor 216, the outdoor fan 224, and the indoor fan 238 at 100% per max values at the current ambient conditions. Further the outdoor electronic expansion valve 222 set-point and starting point shall be at 100% per max values at the current ambient conditions. In efficiency mode, a setback cycle may begin with the compressor 216, the outdoor fan 224 and the indoor fan 238 operating based on Equation 1, above, where A % is a lower value than where the system is operating in a normal mode. If the offset temperature is satisfied by a set-point change, the temperature/humidity controller 322 may ramp to the ramp-down frequency at the maximum ramp rate and stop. The indoor fan 238 may then shut off per requirements in the thermostat 22, and the outdoor fan 224 may shut off after a specified delay.

The above examples may also be modified based on a slew rate for one or more components within the system. For example, where the compressor 216 has reached a lower limit, any change to the system 100 requiring a change in the compressor 216 speed must not exceed a ramp rate of the system. In one embodiment, the ramp rate may be 10% per minute. However, the ramp rate may be more than 10% per minute or less than 10% per minute, based on the system 100. Similarly, the indoor fan 238, the outdoor fan 224, the superheat set point and/or the outdoor electronic expansion valve 222 positions may execute a slew rate based as described above.

Figure 4:
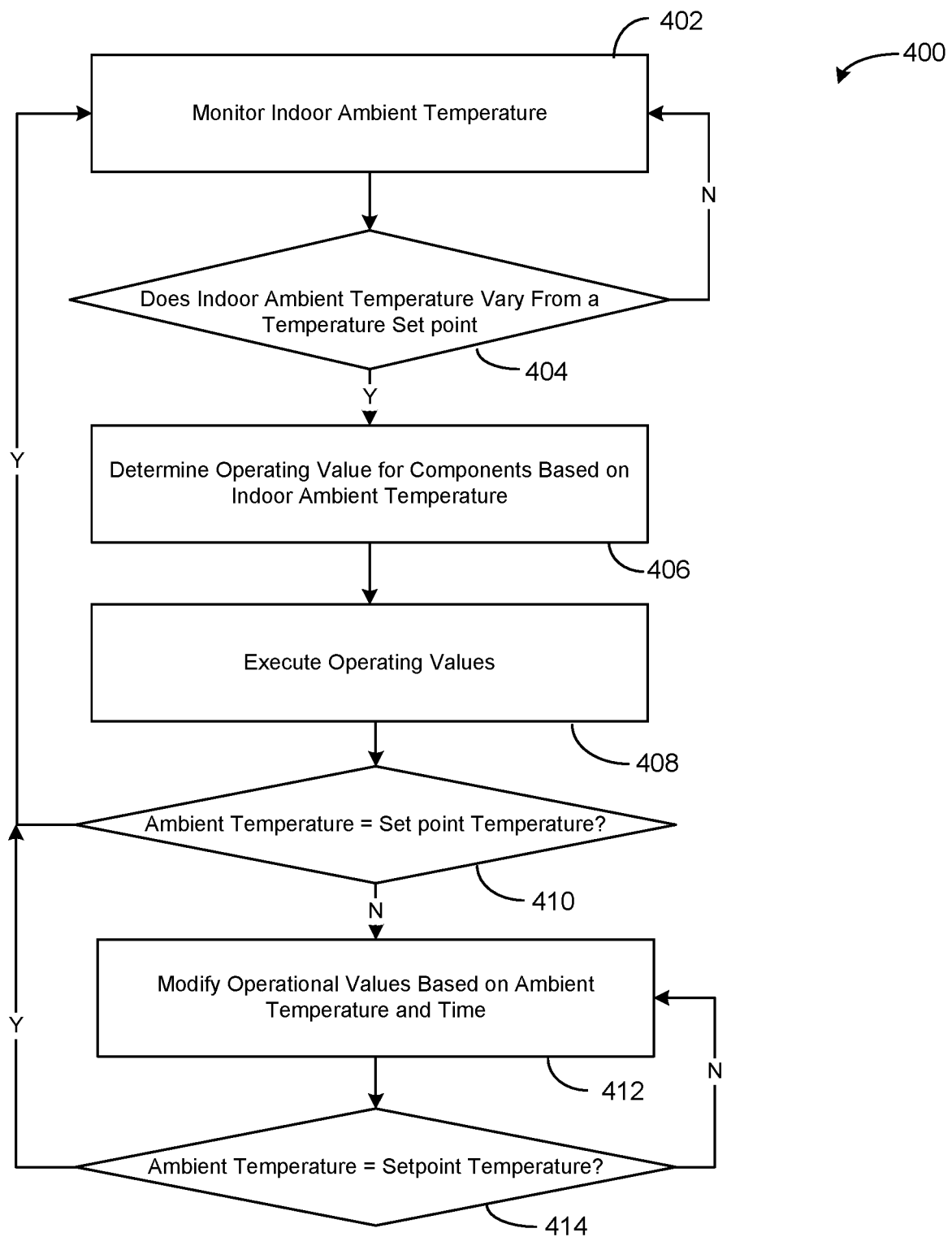
FIG. 4 is a flow chart illustrating a process for controlling a temperature in a residential HVAC system is shown, according to some embodiments.

Turning now to FIG. 4, a process 400 for controlling a temperature in a residential HVAC system is shown, according to some embodiments. At process block 402, the indoor ambient temperature of a residence is monitored. In one embodiment, a thermostat, such as thermostat 22 measures the indoor ambient temperature. In other embodiments, an indoor ambient temperature sensor 202 may monitor the indoor ambient temperature and provide the indoor ambient temperature to the thermostat 22. In some embodiments, the thermostat 22 provides the indoor ambient temperature to the outdoor unit controller 204.

At process block 404, the indoor ambient temperature is compared to a temperature set point to determine if the indoor ambient temperature varies from the temperature set point. In some embodiments, the thermostat 22 compares the ambient indoor temperature to the temperature set point. However, in other examples, other devices, such as the outdoor unit controller 204 may compare the indoor ambient temperature to the temperature set point. In some embodiments, the indoor ambient temperature is evaluated to determine if it varies from the temperature by a defined amount. For example, as described above, the indoor ambient temperature may be evaluated to determine if the indoor ambient temperature exceeds the set point temperature by an amount equal to or greater than a predetermined deadband value. For example, the deadband value may be 0.5°-2° above or below the set point temperature. If the indoor ambient temperature is determined not to vary from the temperature set point by a predetermined value, the system 100 continues to monitor the ambient temperature at 402.

Where the indoor ambient temperature varies from the temperature set point by a predetermined amount, the process determines an updated operating value for one or more components based on the indoor ambient temperature at 406. The one or more components may include an indoor fan, and outdoor fan, a compressor, an EEV, or other applicable component as described above. For some components the operating values may related to an operating speed. For example, for a compressor, an outdoor fan, and/or an indoor fan, the operating value may be related to a speed. For other components, such as the superheat set point or the EEV start position, the operating values may be related to other parameters. In one embodiment, the operating values are determined based on an outdoor ambient temperature, using the equations listed above. Once the operating values are determined, the operating values are transmitted to the respective components at 408.

At 410, the process 400 determines if the indoor ambient temperature is equal to the set point temperature. In one embodiment, the thermostat 22 determines if the indoor ambient temperature is equal to the set point temperature. In other embodiments, other components, such as the outdoor unit controller 204 may determine if the indoor ambient temperature is equal to the set point temperature. In one embodiment, the indoor ambient temperature is evaluated after a predefined amount of time to determine if the indoor ambient temperature is equal to the set point temperature. For example, the indoor ambient temperature may be evaluated after ten minutes to determine if the indoor ambient temperature is equal to the set point temperature. In other embodiments, the indoor ambient temperature may be evaluated after less than ten minutes or after ten minutes. In some examples, the indoor ambient temperature may be determined to be equal to the set point temperature when the indoor ambient temperature is within a predetermined value of the set point. For example, the indoor ambient temperature may be determined to be equal to the set point temperature when the indoor ambient temperature is within 0.1° of the set point temperature. However, values of more than 0.1° or less than 0.1° may also be used. If the ambient temperature is determined to equal the set point temperature, the system 100 monitors the indoor ambient temperature at 402. If the ambient temperature is not equal to the set point temperature, the operational values for the one or more components are modified based on the indoor ambient temperature value and time at 412. For example, the operational values may be modified using the equations listed above. Specifically, the operational values may be modified based on the time dependent multipliers B and C, described above.

Once the operational values have been modified, the indoor ambient temperature is evaluated to determine if the indoor ambient temperature is equal to the set point temperature at 414. The indoor ambient temperature may be evaluated at 414 in the same manner that the indoor ambient temperature is evaluated at process block 410. If the indoor ambient temperature is determined to be equal to the set point temperature, the indoor ambient temperature is monitored at 402. If the ambient temperature is determined to not equal the set point temperature, the operational values are modified again at 412. The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted.

Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A residential HVAC system, the system comprising:
a compressor;
a memory device configured to store one or more tables, the one or more tables comprising a plurality of minimum operating values, a plurality of maximum operating values, a plurality of additional component minimum operating values, a plurality of additional component maximum operating values, and a plurality of values of outdoor ambient temperature, the plurality of minimum operating values, the plurality of maximum operating values, the plurality of additional component minimum operating values, and the plurality of additional component maximum operating values each linked with a particular value of the plurality of values of the outdoor ambient temperature by the one or more tables; and
a processing circuit configured to:
receive an indoor ambient temperature and a temperature set point;
determine the outdoor ambient temperature;
determining a percentage value based on a function, the function comprising one or more coefficients, the function based on the indoor ambient temperature and the temperature set point;
retrieving, from the one or more tables, a minimum operating value of the plurality of minimum operating values and an additional component minimum operating value of the plurality of additional component minimum operating values based on the outdoor ambient temperature;
retrieving, from the one or more tables, a maximum operating value of the plurality of maximum operating values and an additional component maximum operating value of the plurality of additional component maximum operating values based on the outdoor ambient temperature;
determining a delta value by subtracting the minimum operating value from the maximum operating value and a second delta value by subtracting the additional component minimum operating value from the additional component maximum operating value; and
determining a compressor operating value for the compressor by multiplying the delta value and the percentage value and an additional component operating value for an additional component of the residential HVAC system by multiplying the second delta value by the percentage value; and
modify a current operating value of the compressor with the compressor operating value and an additional component current operating value of the additional component with the additional component operating value.

2. The system of claim 1, wherein the compressor operating value is a speed of the compressor.

3. The system of claim 1, further comprising determining one or more additional operating values for one or more other components of the system;
wherein the one or more additional operating values are determined based on the percentage value, a second minimum operating value for each the one or more other components, and a second maximum operating value for each the one or more other components.

4. The system of claim 3, wherein the one or more other components comprise at least one of an indoor fan or an outdoor fan.

5. The system of claim 3, wherein the one or more additional operating values are at least one of a fan speed or a flow rate.

6. The system of claim 3, wherein the one or more additional operating values comprise a superheat set point.

7. The system of claim 1, wherein the indoor ambient temperature is monitored by a thermostat.

8. The system of claim 7, further comprising an outdoor unit controller, wherein the outdoor unit controller is configured to communicate with the thermostat via a network.

9. A method of modifying one or more operational values of a residential HVAC system, the method comprising:
monitoring an indoor ambient temperature of a residential building;
comparing the indoor ambient temperature to a temperature set point;
storing, in a memory device, one or more tables, the one or more tables comprising a plurality of minimum operating values, a plurality of maximum operating values, a plurality of additional component minimum operating values, a plurality of additional component maximum operating values, and a plurality of values of outdoor ambient temperature, the plurality of minimum operating values, the plurality of maximum operating values, the plurality of additional component minimum operating values, and the plurality of additional component maximum operating values each linked with a particular value of the plurality of values of the outdoor ambient temperature by the one or more tables;
determining a percentage value based on a function, the function comprising one or more coefficients, the function based on the indoor ambient temperature and the temperature set point;
retrieving, from the one or more tables, a minimum operating value of the plurality of minimum operating values and an additional component minimum operating value of the plurality of additional component minimum operating values based on the outdoor ambient temperature;
retrieving, from the one or more tables, a maximum operating value of the plurality of maximum operating values and an additional component maximum operating value of the plurality of additional component maximum operating values based on the outdoor ambient temperature;
determining a delta value by subtracting the minimum operating value from the maximum operating value and a second delta value by subtracting the additional component minimum operating value from the additional component maximum operating value;
determining a compressor operating value for a compressor by multiplying the delta value and the percentage value and an additional component operating value for an additional component of the residential HVAC system by multiplying the second delta value by the percentage value; and modifying a current operating value of the compressor with the compressor operating value and an additional component current operating value of the additional component with the additional component operating value.

10. The method of claim 9, wherein the compressor is a variable speed drive compressor.

11. The method of claim 10, wherein the compressor operating value is a compressor speed.

12. The method of claim 9, wherein the indoor ambient temperature is monitored by a thermostat.

13. The method of claim 12, wherein the method further comprises receiving the indoor ambient temperature from the thermostat.

14. The method of claim 9, further comprising determining one or more additional operating values for one or more other components of the system based on the percentage value, a second minimum operating value for each the one or more other components, and a second maximum operating value for each the one or more other components.

15. The method of claim 14, wherein the one or more other components comprise at least one of an indoor fan, an outdoor fan, or an electronic expansion valve (EEV).

16. An outdoor unit of a building system comprising a processing circuit configured to:
    determine a scaling percentage value based on an indoor ambient temperature and a temperature set point;
    determine an operating speed for a compressor by multiplying the scaling percentage value with a first difference of a maximum compressor operating value and a minimum compressor operating value indicated for a particular outdoor ambient temperature by a data storage device of the outdoor unit;
    determine an additional component operating value by multiplying the scaling percentage value with a second difference of a maximum additional component operating value and a minimum additional component operating value indicated for the particular outdoor ambient temperature by the data storage device; and
    modify a current operating speed of the compressor with the operating speed and a current operating value of the additional component with the additional component operating value.

17. The outdoor unit of claim 16, wherein the additional component is at least one of an indoor fan or an outdoor fan.

18. The outdoor unit of claim 16, wherein the additional component operating value is are at least one of a fan speed or a flow rate.

19. The outdoor unit of claim 16, wherein the additional component is an electronic expansion valve (EEV), wherein the additional component operating value comprises an EEV setpoint.

* * * * *